(12) United States Patent
Nakagawa

(10) Patent No.: US 9,641,720 B2
(45) Date of Patent: May 2, 2017

(54) INFORMATION PROCESSING APPARATUS SEARCHING OPERATION/JOB LOG INFORMATION BASED ON SELECTION OF DISPLAYED JOB/OPERATION LOG INFORMATION

(75) Inventor: Isamu Nakagawa, London (GB)

(73) Assignee: Canon Kabushiki Kaisha, Tokyo (JP)

(*) Notice: Subject to any disclaimer, the term of this patent is extended or adjusted under 35 U.S.C. 154(b) by 679 days.

(21) Appl. No.: 12/988,625

(22) PCT Filed: Jun. 25, 2009

(86) PCT No.: PCT/JP2009/062069
§ 371 (c)(1),
(2), (4) Date: Oct. 19, 2010

(87) PCT Pub. No.: WO2010/004921
PCT Pub. Date: Jan. 14, 2010

(65) Prior Publication Data
US 2011/0043845 A1  Feb. 24, 2011

(30) Foreign Application Priority Data

Jul. 9, 2008 (JP) ................ 2008-179470

(51) Int. Cl.
*G06F 3/12* (2006.01)
*H04N 1/32* (2006.01)
*H04N 1/00* (2006.01)

(52) U.S. Cl.
CPC ..... *H04N 1/32106* (2013.01); *H04N 1/00411* (2013.01); *H04N 1/00832* (2013.01);
(Continued)

(58) Field of Classification Search
CPC ........... H04N 1/00411; H04N 1/32106; H04N 1/00832
(Continued)

(56) References Cited

U.S. PATENT DOCUMENTS

2006/0053167 A1* 3/2006 Yamada ............ G06F 17/30244
2006/0221384 A1* 10/2006 Tanaka ................. G06F 3/1213
358/1.15

(Continued)

FOREIGN PATENT DOCUMENTS

| CN | 101064760 A | 10/2007 |
| CN | 101094284 A | 12/2007 |

(Continued)

OTHER PUBLICATIONS

Chinese Office Action dated Jan. 17, 2013, in corresponding Chinese Application No. 200980126934.7.

*Primary Examiner* — Henok A Shiferaw
(74) *Attorney, Agent, or Firm* — Fitzpatrick, Cella, Harper & Scinto

(57) ABSTRACT

A document ID is recorded in an operation log, and an operation ID and document ID are recorded in a job log. The job log and operation log are set such that they can be searched in association with each other. An operation log record associated with a designated document record is read and added to a result list (S2104). Operation log records are read out one by one from the result list. If an associated document ID is found, it is added to a target document ID (S2109). Further, an operation log record associated with the found document ID is added to the result list (S2104).

21 Claims, 26 Drawing Sheets

(52) U.S. Cl.
CPC ........ *H04N 2201/0094* (2013.01); *H04N 2201/3202* (2013.01); *H04N 2201/3205* (2013.01); *H04N 2201/3208* (2013.01); *H04N 2201/3214* (2013.01); *H04N 2201/3216* (2013.01); *H04N 2201/3219* (2013.01); *H04N 2201/3221* (2013.01); *H04N 2201/3222* (2013.01); *H04N 2201/3223* (2013.01); *H04N 2201/3226* (2013.01); *H04N 2201/3273* (2013.01); *H04N 2201/3274* (2013.01)

(58) Field of Classification Search
USPC .................................................... 358/1.13
See application file for complete search history.

(56) References Cited

U.S. PATENT DOCUMENTS

| | | | |
|---|---|---|---|
| 2007/0250714 A1 | 10/2007 | Kawada | |
| 2007/0266057 A1* | 11/2007 | Utsumi | G06F 17/30011 |
| 2007/0291284 A1 | 12/2007 | Kittaka et al. | |
| 2008/0100873 A1* | 5/2008 | Ohtsu | G06F 17/211 |
| | | | 358/403 |

FOREIGN PATENT DOCUMENTS

| | | |
|---|---|---|
| CN | 101175138 A | 5/2008 |
| JP | 2006080747 A | 3/2006 |
| JP | 2007304861 A | 11/2007 |

\* cited by examiner

| DETAILS | |
|---|---|
| ■ ACCEPTANCE NUMBER | ▷ 0013 |
| ■ UPDATE DATE & TIME | ▷ 2008 04/08 21:35 |
| ■ TYPE OF DOCUMENT | ▷ 🗎 NO PRINT SETTING |
| ■ DOCUMENT NAME | ▷ abc |
| ■ USER NAME | ▷ |
| ■ PAGES | ▷ 1 |
| ■ COPIES | ▷ 1 |
| ■ RESOLUTION | ▷ 600 × 600dpi |
| ■ SIZE | ▷ A3 |
| ■ COLOR / MONOCHROME | ▷ MONOCHROME |
| ▶ CHANGE DOCUMENT NAME | CLOSE ⏎ |

| OPERATION ID | DATE & TIME | OPERATOR | PROCESS | PARAMETERS |
|---|---|---|---|---|
| 122 | 2008.03.12 10:03:45 | | LOGIN | DEPARTMENT ID : 1000 |
| 123 | 2008.03.12 10:03:55 | DEPARTMENT ID : 1000 | BUTTON : BOX | |
| 124 | 2008.03.12 10:04:15 | DEPARTMENT ID : 1000 | BUTTON : SCAN DOCUMENT | |
| 125 | 2008.03.12 10:04:54 | DEPARTMENT ID : 1000 | BUTTON : DENSITY | +2 |
| 126 | 2008.03.12 10:05:01 | DEPARTMENT ID : 1000 | BUTTON : SCAN MODE | TEXT |
| 127 | 2008.03.12 10:06:45 | DEPARTMENT ID : 1000 | INPUT CHARACTER STRING | DOCUMENT NAME TEXT : TopSecret |
| 128 | 2008.03.12 10:07:00 | DEPARTMENT ID : 1000 | BUTTON : START | GENERATE DOCUMENT DOCUMENT ID : 345, DOCUMENT NAME : TopSecret |
| 129 | 2008.03.12 10:07:45 | DEPARTMENT ID : 1000 | BUTTON : ID | LOGOUT |

F I G. 12

| OPERATION ID | DATE & TIME | OPERATOR | PROCESS | PARAMETERS |
|---|---|---|---|---|
| 225 | 2008.03.13 10:04:54 | DEPARTMENT ID : 2000 | SELECT DOCUMENT | DOCUMENT NAME : TopSecret, DOCUMENT ID : 345 |
| 226 | 2008.03.13 10:05:01 | DEPARTMENT ID : 2000 | BUTTON : COPY | DOCUMENT ID : 346, ORIGINAL DOCUMENT ID : 345 |
| 227 | 2008.03.13 10:06:45 | DEPARTMENT ID : 2000 | BUTTON : EDIT MENU | |
| 228 | 2008.03.13 10:07:00 | DEPARTMENT ID : 2000 | BUTTON : CHANGE DOCUMENT NAME | |
| 229 | 2008.03.13 10:07:00 | DEPARTMENT ID : 2000 | INPUT CHARACTER STRING | MySchedule CHANGE DOCUMENT NAME NEW DOCUMENT NAME : MySchedule, ORIGINAL DOCUMENT NAME : TopSecret |

F I G. 13

| OPERATION ID | DATE & TIME | OPERATOR | PROCESS | PARAMETERS |
|---|---|---|---|---|
| 325 | 2008.03.14 10:04:54 | DEPARTMENT ID : 2000 | SELECT DOCUMENT | DOCUMENT NAME : TopSecret, DOCUMENT ID : 346 |
| 326 | 2008.03.14 10:05:01 | DEPARTMENT ID : 2000 | BUTTON : PRINT | |

FIG. 14

| ITEM | EXAMPLE |
|---|---|
| OPERATION ID | 128 |
| JOB LOG RECORD NUMBER | 7 |
| JOB TYPE | SCAN |
| JOB ID | 7 |
| STATUS | NORMAL END |
| START TIME | 2008.03.12 10:07:00 |
| END TIME | 2008.03.12 10:07:12 |
| DEPARTMENT ID | 1000 |
| DOCUMENT NAME | TopSecret |
| DOCUMENT ID | 345 |
| NUMBER OF SCANNED SURFACES | 12 |
| PAPER SIZE | A4 |
| COLOR MODE | COLOR |
| SCAN MODE | TEXT |

FIG. 15

| ITEM | EXAMPLE |
|---|---|
| OPERATION ID | 326 |
| JOB LOG RECORD NUMBER | 13 |
| JOB TYPE | PRINT |
| JOB ID | 13 |
| STATUS | NORMAL END |
| START TIME | 2008.03.14  10:05:01 |
| END TIME | 2008.03.14  10:05:13 |
| DEPARTMENT ID | 2000 |
| DOCUMENT NAME | abc |
| NUMBER OF LOGICAL SURFACES | 12 |
| PAPER SIZE | A4 |
| NUMBER OF DELIVERED SHEETS | 12 |
| NUMBER OF PRINT SURFACES | 12 |
| PAGE LAYOUT | 1 |
| COLOR MODE | COLOR |
| PRINT SIDE | SINGLE |

F I G. 26

| OPERATION ID | DATE & TIME | OPERATOR | PROCESS | PARAMETERS |
|---|---|---|---|---|
| 625 | 2008.06.14 10:04:54 | DEPARTMENT ID : 2000 | SELECT DOCUMENT | DOCUMENT NAME : abc, DOCUMENT ID : 346 |
| 626 | 2008.06.14 10:05:01 | DEPARTMENT ID : 2000 | BUTTON : SEND | |
| 627 | 2008.06.14 10:08:01 | DEPARTMENT ID : 2000 | SELECT DESTINATION | NAME : MP1, IP ADDRESS : 172.10.20.30 |
| 628 | 2008.06.14 10:15:01 | DEPARTMENT ID : 2000 | BUTTON : DECIDE | DOCUMENT ID : 345 NAME : MP1, IP ADDRESS : 172.10.20.30 |

F I G. 27

| ITEM | EXAMPLE |
|---|---|
| OPERATION ID | 626 |
| JOB LOG RECORD NUMBER | 1300 |
| JOB TYPE | SEND |
| JOB ID | 1300 |
| STATUS | NORMAL END |
| START TIME | 2008.06.14 10:15:01 |
| END TIME | 2008.06.14 10:15:21 |
| DEPARTMENT ID | 2000 |
| DOCUMENT NAME | abc |
| DOCUMENT ID | 345 |
| DESTINATION NAME | MFP2 |
| DESTINATION ID | ABC00002 |
| IP ADDRESS | 172.10.20.31 |

FIG. 28

| ITEM | EXAMPLE |
|---|---|
| SOURCE OPERATION ID | 626 |
| JOB LOG RECORD NUMBER | 2300 |
| JOB TYPE | RECEIVE |
| JOB ID | 1300 |
| STATUS | NORMAL END |
| START TIME | 2008.06.14 10:15:01 |
| END TIME | 2008.06.14 10:15:21 |
| SOURCE DEPARTMENT ID | 2000 |
| DOCUMENT NAME | abc |
| SOURCE DOCUMENT ID | 345 |
| SOURCE NAME | MFP0 |
| SOURCE ID | ABC00000 |
| SOURCE IP ADDRESS | 172.10.20.30 |

INFORMATION PROCESSING APPARATUS SEARCHING OPERATION/JOB LOG INFORMATION BASED ON SELECTION OF DISPLAYED JOB/OPERATION LOG INFORMATION

TECHNICAL FIELD

The present invention relates to an image processing apparatus, image processing method, and image processing system for, for example, inputting and outputting an image, or holding and storing an image.

BACKGROUND ART

Along with the progress of an information society, an enormous amount of data is accumulated in a device equipped with a storage. It is very convenient to exchange accumulated image data and document data (to be generically referred to as document data). However, this raises the risk of information leakage.

The Personal Information Protection Law has been in force since 2005. Companies are responsible for appropriately managing information, and it is essential to their survival. In this situation, companies have made efforts to prevent leakage of information from electronic documents, and even if information leaks, easily track it.

As one of these efforts, there is proposed an image processing apparatus capable of grasping the access log and operation log of all managed document data, and detecting a user, document data accessed by him, and an operation executed to the document data by him (see, e.g., Japanese Patent Laid-Open No. 2007-304861).

However, the conventional technique suffers the following problems.

(1) When many operations were done to given document data, the access log needs to be visually checked to search for a cause of information leakage such as an operation which leaked information and a user who did it. This is very cumbersome.

(2) When given document data was viewed or output after it was electronically copied or its document name was changed, it is difficult to detect a user who accessed the original document data.

(3) When given document data was transferred to a third-party apparatus, the apparatus cannot track the viewing or print state of the document data.

DISCLOSURE OF INVENTION

The present invention has been made in consideration of the above situation. To solve the conventional problems, it is an object of the present invention to provide a method capable of associating an operation performed by a user in an image forming apparatus, a process executed in the image forming apparatus, and the like to easily grasp their relationship, more easily and quickly specifying a cause of information leakage or the like, and even if a document name has been changed or document data has been moved or copied, specifying a cause of information leakage.

To achieve the object, the present invention comprises the following arrangement.

That is, an information processing apparatus including a display unit, the apparatus comprises: first storage means, configured to store, for each operation in an image processing apparatus, operation log information which associates an operation ID of the operation, a document ID of document data generated by the operation, and information on an operator; second storage means, configured to store, for each job executed in the image processing apparatus, job log information which associates a job ID of the job, a document ID associated with the job, and information on an operator; control means for controlling the display unit to display a list window of the job log information stored in the second storage means; and search means, configured to search the first storage means for operation log information which matches at least either of the document ID and the information on the operator that are contained in job log information selected by a user via the window displayed under control of the control means, wherein the control means controls the display unit to display a list window of the operation log information found by the search means.

Another aspect of the present invention comprises the following arrangement.

That is, An information processing apparatus including a display unit, the apparatus comprises: first storage means, configured to store, for each operation in an image processing apparatus, operation log information which associates an operation ID of the operation, a document ID of document data generated by the operation, and information on an operator; second storage means, configured to store, for each job executed in the image processing apparatus, job log information which associates a job ID of the job, a document ID associated with the job, and information on an operator; control means, configured to control the display unit to display a list window of the operation log information stored in the first storage means; and search means, configured to search the second storage means for job log information which matches at least either of the document ID and the information on the operator that are contained in operation log information selected by a user via the window displayed under control of the control means, wherein the control means controls the display unit to display a list window of the job log information found by the search means.

Still another aspect of the present invention comprises the following arrangement.

That is, An information processing apparatus comprises: first storage means, configured to store, for each operation in an image processing apparatus, operation log information which associates an operation ID of the operation, a document ID of document data generated by the operation, and information on an operator; and second storage means, configured to store, in association with each other, job log information of a job executed in the image processing apparatus that associates a job ID of the job, a document ID associated with the job, and information on an operator, and an operation ID of an operation performed when the job is executed, wherein the operation log information stored in the first storage means and the job log information stored in the second storage means can be referred to based on the operation ID.

According to the present invention, an operation performed by a user in an image processing apparatus, a process executed in the image processing apparatus, and the like can be associated to easily grasp their relationship. More specifically, a cause of information leakage can be specified more easily and quickly. Even if a document name has been changed or document data has been moved or copied, a cause of information leakage can be specified.

Further features of the present invention will become apparent from the following description of exemplary embodiments with reference to the attached drawings.

BRIEF DESCRIPTION OF DRAWINGS

FIG. 7 is a schematic view showing an example of a document information display;

FIG. 11 is a table showing an example of an operation log;

FIG. 12 is a table showing an example of an operation log;

FIG. 13 is a table showing an example of a print log;

FIG. 14 is a table showing an example of a scan job log;

FIG. 15 is a table showing an example of a print job log;

FIG. 26 is a view showing an example of a send operation log;

FIG. 27 is a table showing an example of a send job log; and

FIG. 28 is a table showing an example of a reception job log.

BEST MODE FOR CARRYING OUT THE INVENTION

First Embodiment

Arrangement of MFP

Figure 1:
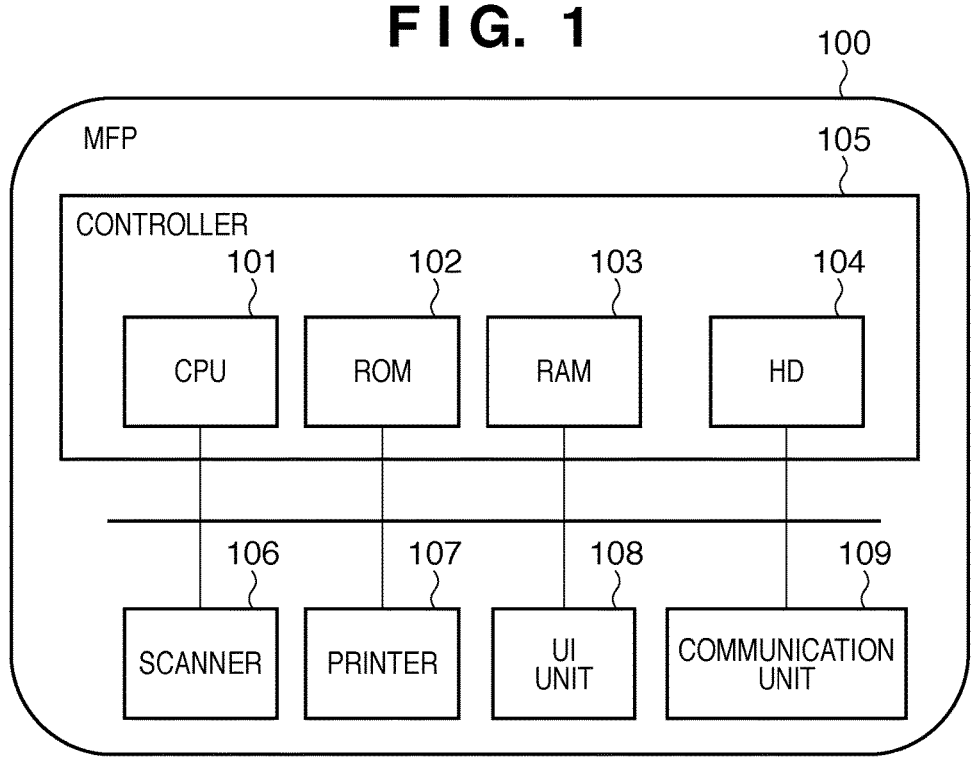
FIG. 1 is a block diagram of the arrangement of an MFP.

A preferred embodiment of the present invention will be described below with reference to the accompanying drawings. FIG. 1 is a block diagram of an MFP (Multi Functional Peripheral) 100. The MFP is a device with a plurality of functions such as copying, printing, and scanning. The MFP has an image processing function, and therefore is sometimes called an image processing apparatus.

Referring to FIG. 1, a controller 105 for controlling the whole device incorporates the following components. A CPU (Central Processing Unit) 101 controls the controller 105 and performs an arithmetic process and the like. A ROM (Read Only Memory) 102 is a storage area for information on a system boot program and the like. A RAM 103 is an area where programs such as an operating system, communication control, and engine control are loaded and executed, and data are stored. The RAM 103 is a data storage area free from any use restriction. An HD (Hard Disk) 104 is a storage for data and program files, and can also be implemented by a nonvolatile storage such as an SRAM.

A scanner 106 optically scans an image on paper or the like, and converts it into image data under the control of the controller 105. This operation is called a scan operation. A printer 107 prints under the control of the controller 105. Printing targets are document data saved in the HD 104, image data scanned by the scanner 106, are the like. Data to be printed will be generically referred to as document data. The document data includes data containing no character, such as image data.

A UI (User Interface) unit 108 interfaces the MFP 100 and a user. The UI unit 108 is an operation unit which accepts an instruction from the user, or a display unit which provides a display for him.

A communication unit 109 performs network communication control, and controls communication with another device and computer. A system bus 110 serves as a data path between these components.

<Software of MFP>

Figure 2:
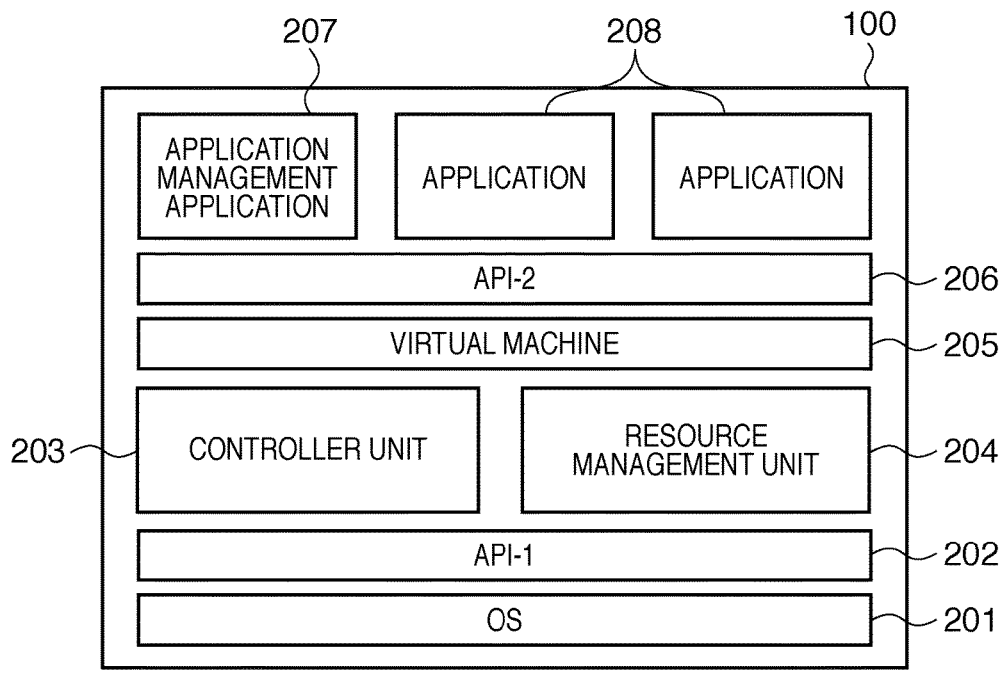
FIG. 2 is a block diagram of software in the MFP.

FIG. 2 is a block diagram of software of the MFP according to the present invention. The software is stored in the ROM 102 or HD 104, and when the MFP is activated, loaded into the RAM 103 and executed.

An OS (Operating System) 201 manages/controls the resources of the whole MFP. An API (Application Program Interface) 202 is an interface for an application running on the OS 201. The application can access a resource in the MFP 100 via the first API 202, and cause the CPU 101 to execute a command. A controller unit 203 running on the OS 201 controls the scanner 106, printer 107, UI or operation unit 108, and the like. A resource management unit 204 restricts the use of resources to a predetermined amount when the controller unit 203, a virtual machine 205 (to be described later), and all applications on the virtual machine 205 use resources such as a memory. The first API 202 may also include a software module to be used by an application. For example, a job log recoding unit 1008, operation log recoding unit 1009, user authentication unit 1010, and charging counter recording unit 1012 shown in FIG. 10 (to be described later) may also be installed to run on the first API 202.

The virtual machine 205 is an execution environment optimum for executing a specific application. The virtual machine 205 is implemented by a Java® virtual machine or the like.

A second API 206 is an interface which allows an application running on the virtual machine 205 to use the controller unit 203, resource management unit 204, first API 202, and the like.

An application management application 207 manages an application running on the virtual machine 205. The application 207 performs downloading/uploading, erase, and validation/invalidation of an application (to be described later).

The application 207 is one of applications running on the virtual machine 205. To add a function to the MFP 100, an application program for providing the function can be installed to operate. The number of applications to be installed is not limited to one, and an arbitrary number of applications can be installed under restrictions on the hardware or software of the MFP 100.

<User Interface>

Figure 3:
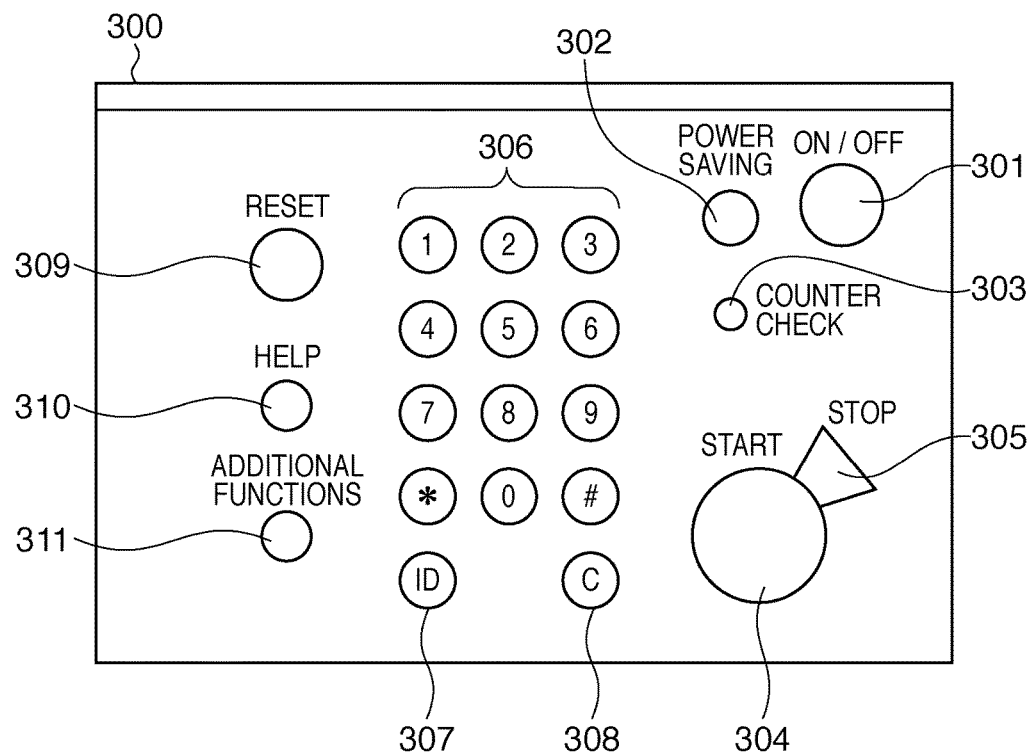
FIG. 3 is a schematic view showing an example of operation keys.
Figure 4:
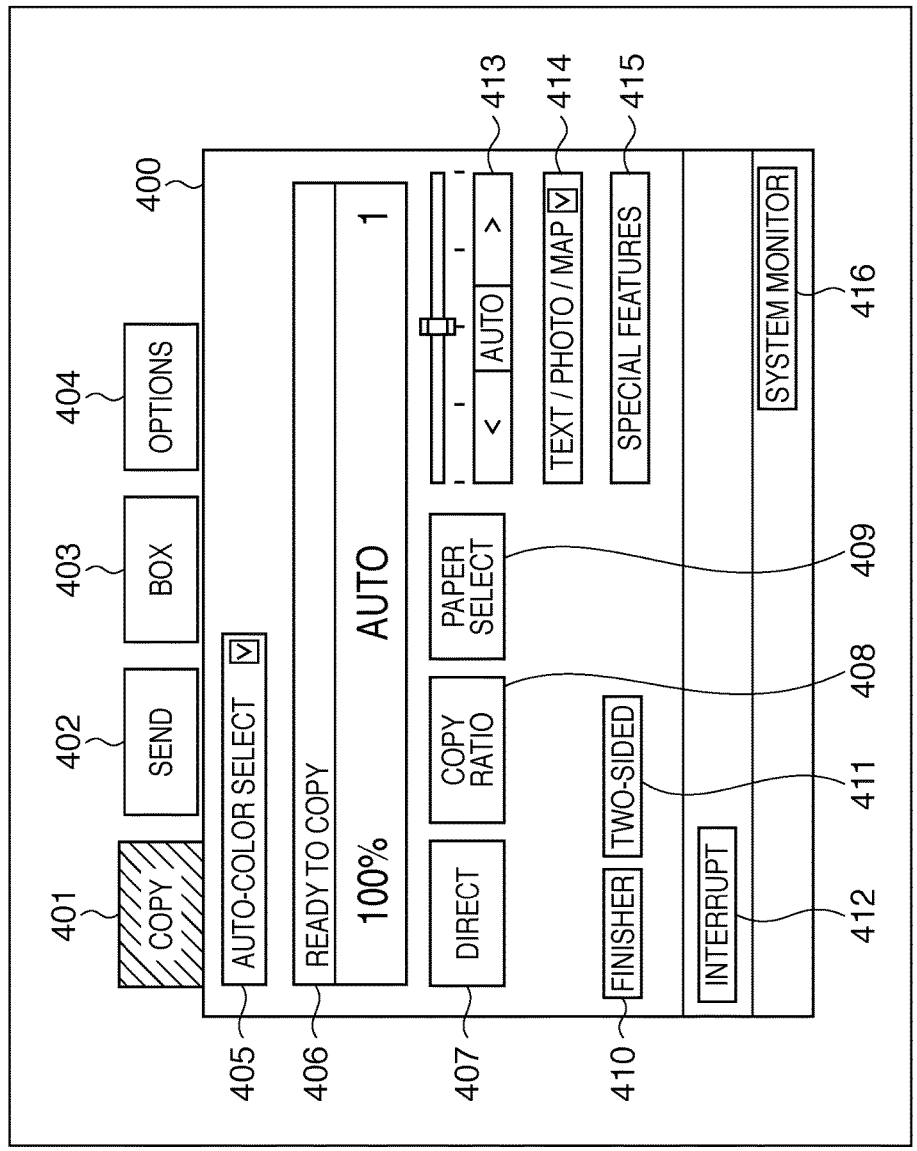
FIG. 4 is a schematic view showing an example of an initial window display.

FIGS. 3 and 4 show examples of UIs (User Interfaces) provided by the UI unit 108. A key input section 300 can accept a user operation with hard keys. An ON/OFF button 301 is a power switch. A power saving key 302 is used to designate a shift to the power saving mode. When the user presses the power saving key 302, the MFP shifts to the power saving mode. In the power saving mode, supply of power to some components of the MFP stops to suppress power consumption of the whole MFP.

A counter check key 303 is used to display a counter value. When the user presses the counter check key 303, a touch panel 400 displays the value of a charging counter. The charging counter counts the number of print sheets (e.g., counter value) in each print mode such as monochrome printing or color printing. When displaying the counter value, a counter value in each mode and a total counter value are displayed. The total is the number of sheets which have been delivered so far after the MFP was installed. The monochrome total is the total of monochrome printed sheets out of the total, and the color total is the total of printed sheets except for monochrome ones out of the total.

A start key 304 is used to designate the start of a process provided by the MFP, such as copy, print, scan, or send. A stop key 305 is used to stop a job which has started using the start key. A ten-key pad 306 is used to enter numerical information. An ID key 307 is used to designate input of authentication information. A clear key 308 is used to designate erase of information entered using the ten-key pad 306. A reset key 309 is used to designate cancellation of all parameters set by a user for a target job. The user presses a help key 310 when he has a question about the operation procedure. The help key 310 is used to designate display of information which assists the operation. An additional function key 311 is used to start various settings.

The UI unit 108 includes a touch panel. The touch panel has a display function, and can accept an input from the operator by detecting whether he has pressed each display region.

<Example of User Interface Display>

A user interface in FIG. 4 is an example of a main menu displayed on the touch panel 400 when the MFP 100 becomes operable.

The user presses a copy button 401 to perform a copy operation. The user presses a send button 402 to perform a send process. The user presses a box button 403 to perform a box process. The user presses an option key 404 to display the window of an application 208. A color selection list box 405 is a control for selecting one of auto selection, color, monochrome, and the like. A status display field 406 displays information to be notified to a user. For example, the status display field 406 displays permission/inhibition of copying, copy ratio, paper selection, and copy count. A direct button 407 is used to designate direct copying. A button 408 is used to designate a copy ratio. A button 409 is used to designate a paper feed source. A finisher button 410 is used to designate whether to execute sorting, finishing, and the like. A two-sided button 411 is used to designate a single or two sides for document scanning and printing. An interrupt button 412 is used to interrupt a job in progress and input a new job. A control 413 includes a slide bar and buttons for density adjustment. By operating the slide bar and buttons, the user designates a print density. A control 414 is used to designate a document scan characteristic to switch the MFP between, for example, the text mode and the photo mode. A special feature button 415 is used to input complicated instructions such as setting of a cover and slip sheet, bookbinding, transparent interleaving, and gutter size. A system monitor button 416 is used to display the state of each component of the MFP and job log information recorded in the MFP.

Figure 5:
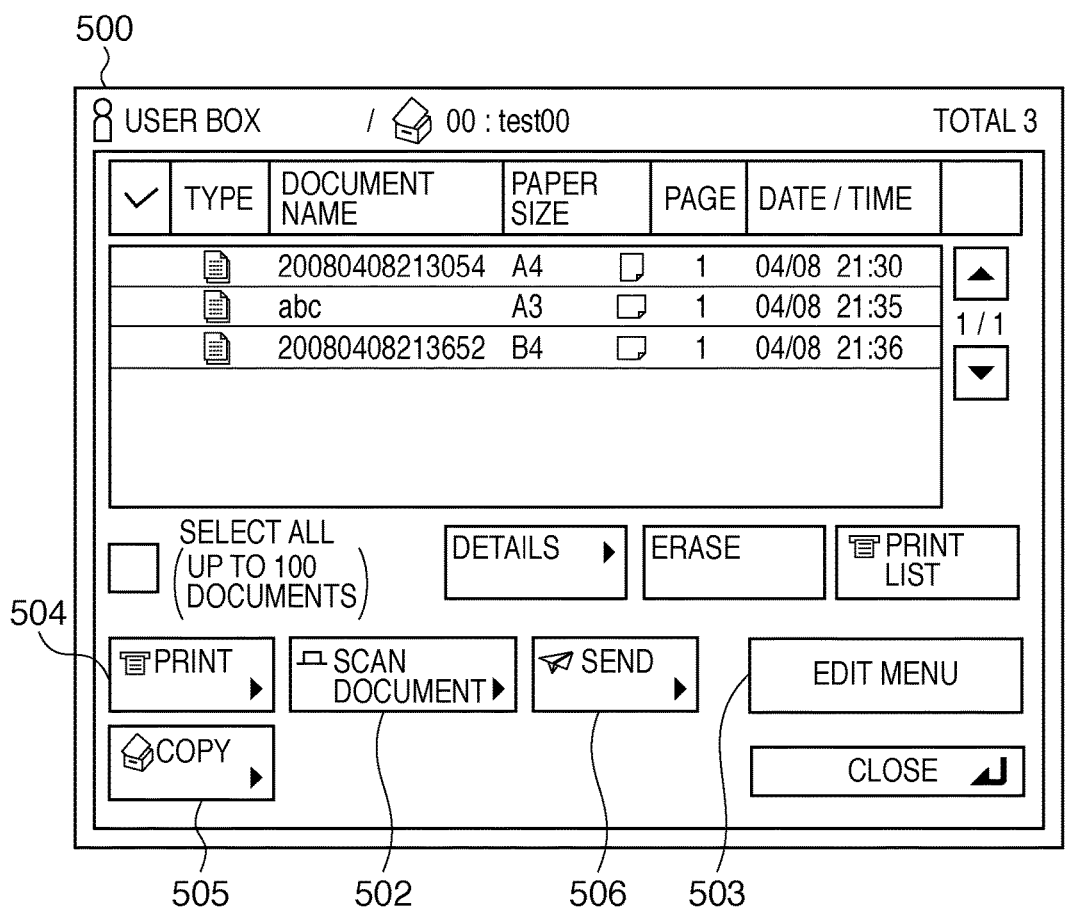
FIG. 5 is a schematic view showing an example of a box list display.

When the user presses the box button 403, a box list window 500 (document list display) in FIG. 5 appears. In the window 500 of FIG. 5, a boxed document list 501 displays the type, document name, paper size, page count, and recording date & time of each document. The type field indicates the color of a saved document. A monochrome icon represents a monochrome document, and a color icon represents a color document. The paper size field indicates a paper size. The page field represents a page count. The date/time field indicates a date & time when the document was recorded. When the user presses a print button 504, the printer 107 prints a document selected from the boxed document list 501. When the user presses a copy button 505 while selecting a document from the boxed document list 501, document data of the selected document is copied to newly generate a copied document with a document name obtained by adding "copy:" to the start of the document name of the original document. The generated document name is added to the boxed document list 501.

Figure 6:
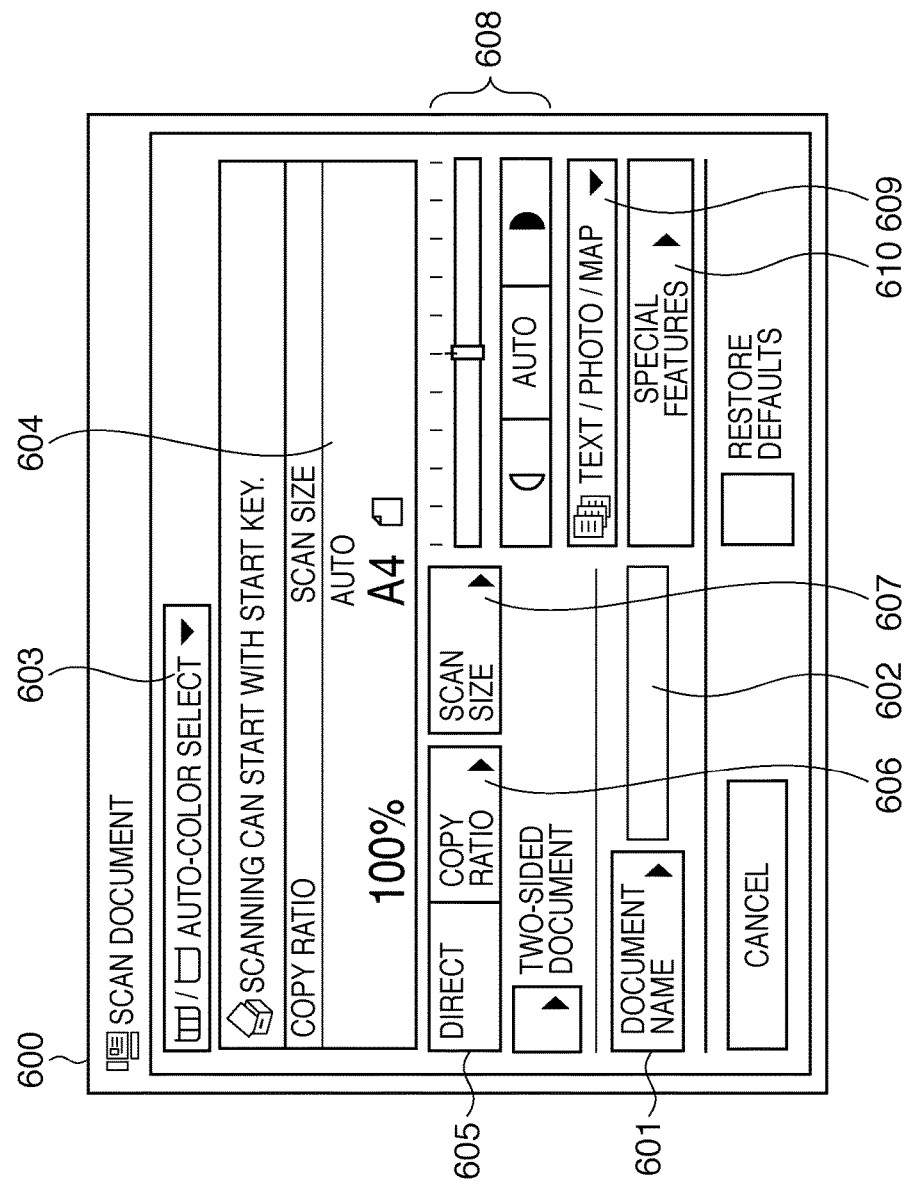
FIG. 6 is a schematic view showing an example of a document scan display.

When the user presses a document scan button 502 in the box list window 500, a document scan window 600 as shown in FIG. 6 appears. When the user presses a document name designation button 601, a document name input window 800 containing a virtual keyboard 804 in FIG. 8 appears. The virtual keyboard 804 has a function of accepting input of an arbitrary character string. After the end of designating a character string, a document name text box 602 displays the designated character string.

A color selection list box 603 is used to select one of auto color selection, color, monochrome, and the like. A status display field 604 displays information of which a user is to be notified. For example, the status display field 604 displays permission/inhibition of copying, copy ratio, and paper selection. A direct button 605 is used to designate direct copying. A button 606 is used to designate a copy ratio. A scan size button 607 is used to designate the size of a document to be scanned, such as A4, A3, or B4. A density adjustment slide bar & button 608 is used to designate a print density. A control 609 is used to designate a document scan characteristic to switch the MFP between, for example, the text mode and the photo mode. A special feature button 610 is used to input more detailed instructions such as two-page separation, enlargement/reduction, frame erase, negative/positive reversal, and area designation (none are shown).

While the document scan window 600 is displayed, the user sets a document to be scanned by the scanner 106, and presses the start key 304. Then, digital data (i.e., document data) of the scanned document is generated. After the generated document data is saved, the field of the saved document data is added to the boxed document list 501 to display the boxed document list 501 again. If no character string is designated in the document name text box 602, a unique name may also be automatically assigned by concatenating, as a document name, the year, month, date, time, minutes, and seconds when the user pressed the start key 304.

Figure 8:
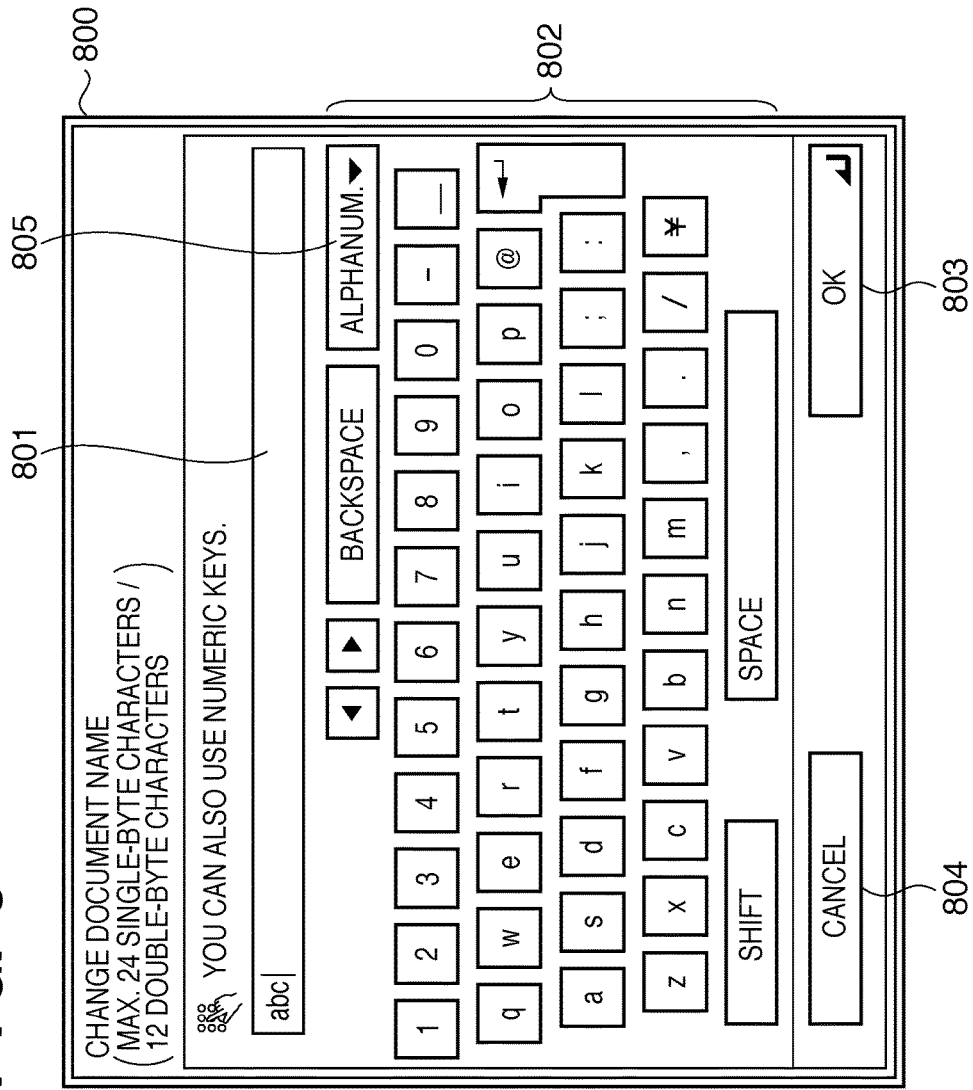
FIG. 8 is a schematic view showing an example of a document name input display.

When the user presses an edit menu button 503 while selecting a document from the box list window 500, a detailed information window shown in FIG. 7 appears. This window displays information (attribute information) on a selected document, including the acceptance number, update date & time, type, document ID (also called a document name or identification information), a user who saved the document, page count, copy count, resolution, paper size, and color (color/monochrome). When the user presses a document name change button 701 in FIG. 7, a document name input window in FIG. 8 appears. In FIG. 8, a text box 801 displays a character string designated by pressing a virtual key pad 802. In response to pressing virtual keys, characters corresponding to the pressed keys are saved and additionally displayed in the text box 801. The user presses an OK button 803 to send a character string entered in the text box 801 to the requesting side. If the user presses a cancel button 804 to stop input of a character string, the window returns to the previous window.

<Login Window>

Figure 9:
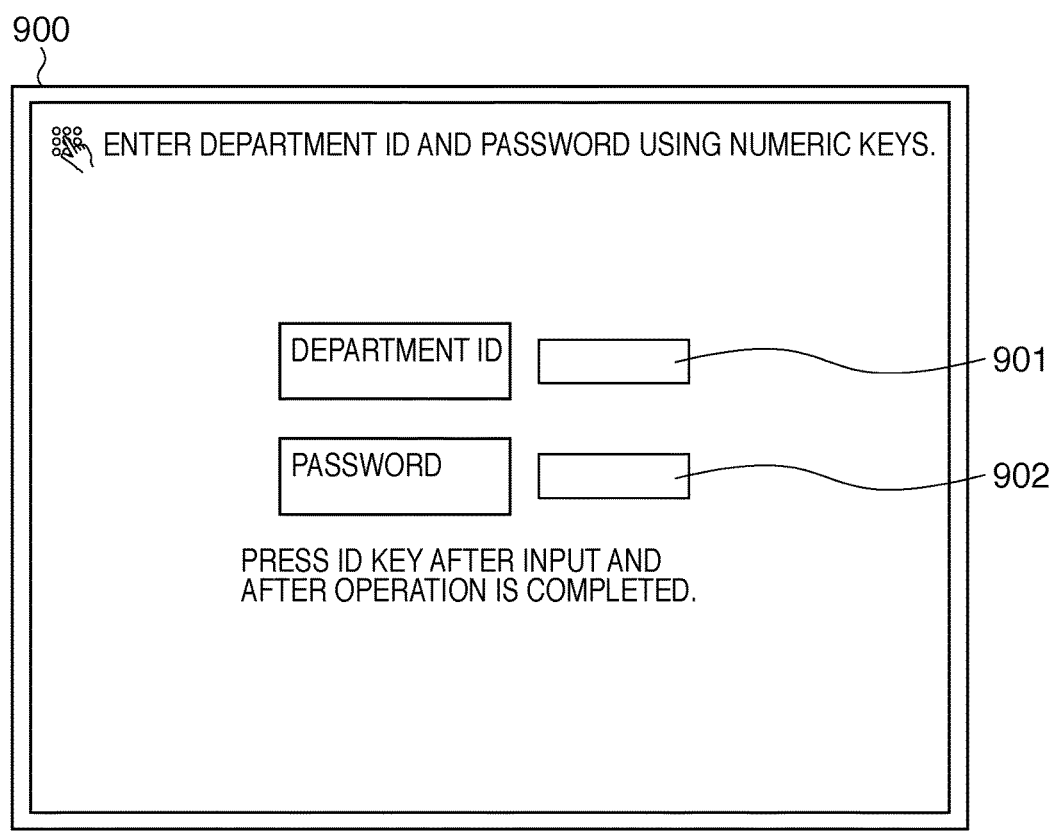
FIG. 9 is a schematic view showing an example of a login display.

FIG. 9 shows an example of a login window. After activation, the MFP can control login by displaying a login window 900 on the touch panel 400. Whether to execute this control can be changed by a setting. A department ID is entered in a text box 901, and a password is entered in a text box 902. The user can enter an arbitrary character string using the key input section 300. When the user presses the ID key 307 after entering a department ID and password, the user authentication unit 1010 collates them. If authentication is successful, the main menu shown in FIG. 4 appears. If authentication fails, the department ID enter text box and password enter text box are cleared, and the window returns to the initial state.

<MFP in which Application According to Embodiment is Installed>

Figure 10:
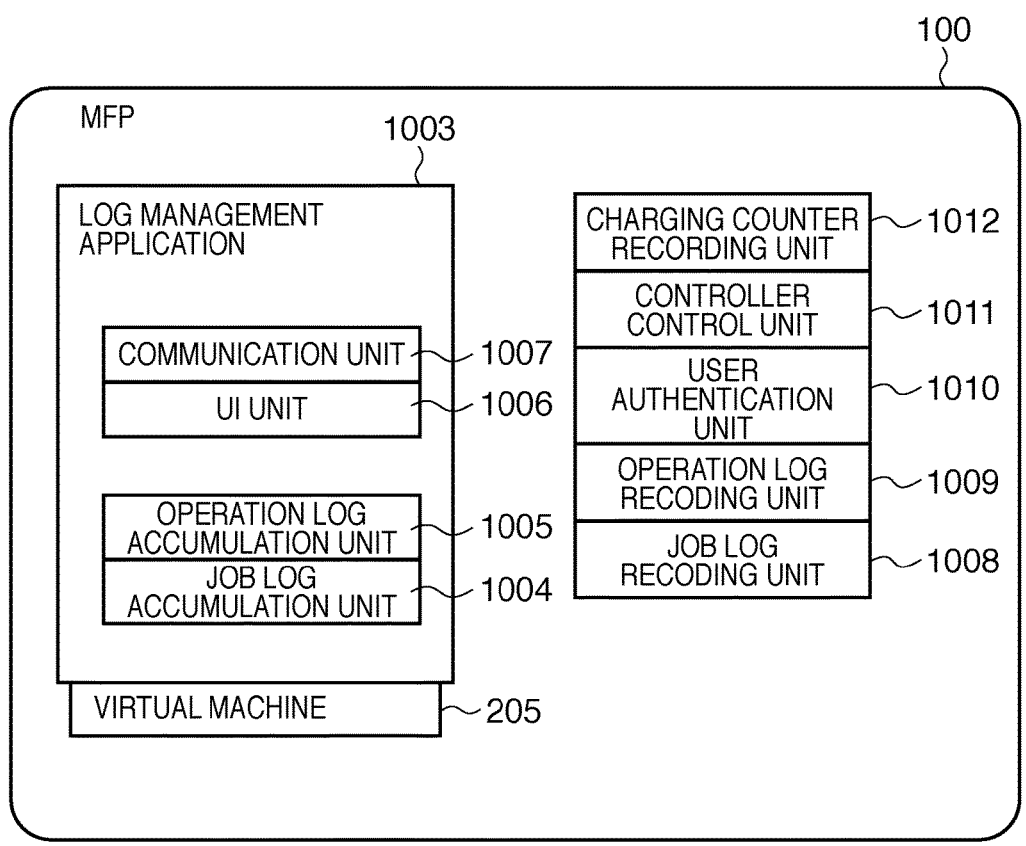
FIG. 10 is a block diagram of an application.

FIG. 10 shows the software configuration of the MFP 100 in which a log management application 1003 is installed as the application program 208. FIG. 10 does not illustrate components not directly related to the log management application 1003 among those shown in FIG. 2. As described with reference to FIG. 2, the job log recoding unit 1008, operation log recoding unit 1009, user authentication unit 1010, charging counter recording unit 1012, and the like may also be installed in advance to run on the first API 202. Alternatively, the job log recoding unit 1008 and operation log recoding unit 1009 may also be installed together with the log management application 1003.

Referring to FIG. 10, the log management application 1003 is installed in an MFP 100. Reference numeral 205 denotes the virtual machine as described above; and 1003, the log management application. The controller unit 203 performs a variety of processes to control the MFP, including execution of a job. During execution of a job, the controller unit 203 records the total number of delivered sheets in the charging counter recording unit 1012 every time a sheet is delivered. Upon completion of the job, the job log recording unit 1008 records information of the job in a nonvolatile memory.

A job log application incorporates blocks 1004 to 1007. The block 1004 is a job log accumulation unit which acquires a job log from the job log recording unit 1008 periodically or every time a job log is generated, and accumulates it permanently. The job log recording unit 1008 includes a storage area for storing the job log of at least the latest job.

The block 1005 is an operation log accumulation unit which acquires an operation log from the operation log recording unit 1009 periodically or every time an operation is done, and accumulates it permanently. The operation log recording unit 1009 includes a storage area for storing the operation log of at least the latest document data.

The UI unit 1006 controls the touch panel 400 to display an operation window, job log, charging counter value, and the like in accordance with an input request from the user.

The communication unit 1007 meets a request from a user who operates the MFP from a remote terminal. For example, in response to a request from the remote terminal, the communication unit 1007 converts the job log, charging counter value, and spreadsheet into HTML (Hyper Text Markup Language) and sends the HTML data to the terminal. In this way, arbitrary information is displayed on a network-connected computer at a remote place, and an input from a computer user is accepted.

The job log recording unit 1008 records a series of processes (jobs) performed by the scanner 106, printer 107, communication unit 109, and the like. The recorded contents include, for example, a job identifier (job ID), start date & time, end date & time, job type (e.g., print, scan, copy, or send), document name, and document ID for each job. The document ID is a unique identifier assigned by an apparatus separately from a document name assigned by a user. FIGS. 14 and 15 show examples of the recorded contents.

The operation log recording unit 1009 records an operation accepted via the key input section 300, touch panel 400, or network. The recorded contents include, for example, a uniquely assigned operation ID, operation start date & time, operation end date & time, operator, process type, and operated parameters for each document data. FIGS. 11 to 13 show examples of the recorded contents.

The user authentication unit 1010 collates user identification information, password, and the like, and gives an appropriate access right. A controller control unit 1011 controls the operation of the MFP. The charging counter recording unit 1012 increments numerical information in accordance with the operations of the scanner 106, printer 107, and the like.

<Example of Operation Log Information>

FIG. 11 shows an example of an operation log associated with a scan operation. The MFP according to the present invention includes the operation log recording unit 1009 which records a user operation. The operation log records an operation ID, date & time, operator information, process, and data (parameters) associated with a process. The operation ID is a character string or figure for uniquely specifying an operation. In this example, the operation ID is a natural number, and a value incremented by one for each operation is assigned. The date & time is the time when the user designated an operation. The process represents the type of executed operation, and the parameter pertains to the type of process. In this example, the operator information is an entered department ID. In the embodiment, log information corresponding to one operation ID is called an operation log record and discriminated from the entire log.

For example, an operation log record of an operation ID "122" in FIG. 11 represents that the operation was done at 10:03:45 on 2008/03/12, the type of operation was login, a value "1000" was entered in the department ID text box, and a correct password was entered in the password text box. That is, an operator with a department ID "1000" logged in at this time.

An operation log record of an operation ID "123" represents that the box button was pressed in a context of a document ID "1000". An operation log record of an operation ID "124" represents that the document scan button 502 was pressed. An operation log record of an operation ID "125" represents that the density slide bar was moved from the center to right by two pitches. An operation log record of an operation ID "126" represents that a text was selected with the scan mode button 609. An operation log record of an operation ID "127" represents that the button 601 was pressed and a character string "TopSecret" was designated from the virtual keyboard. An operation log record of an operation ID "128" represents that the start key 304 was pressed to scan a document by the scanner 106 and generate document data, and the document data was saved with a document ID "345" and document name "TopSecret". An operation log record of an operation ID "129" represents that the ID key 307 was pressed and an operator who had logged in with the document ID "1000" was logged out.

FIG. 12 shows an example of an operation log associated with a copy operation. A description of the same operations as those in FIG. 11 will not be repeated. An operation log record of an operation ID "225" represents that an operator touched a line of the document name "TopSecret" in the document name list 501 to select a document. An operation log record of an operation ID "226" represents that the copy button 505 was pressed to copy the selected document data, and an ID "346" was assigned to the document data copy. An operation log record of an operation ID "227" represents that the edit menu button 503 was pressed. An operation log record of an operation ID "228" represents that the button 701 for changing a document name was pressed. An operation log record of an operation ID "229" represents that a character string "MySchedule" was entered using the virtual keyboard and the OK button was pressed to change the document name from "TopSecret" to "MySchedule".

FIG. 13 shows an example of an operation log associated with a print operation. A description of some of the same operations as those of the above-described operation log will not be repeated. An operation log record of an operation ID "325" represents that an operator touched a line of the document name "MySchedule" in the document name list 501 to select a document. An operation log record of an operation ID "326" represents that the print button 504 was pressed. Upon receiving this instruction, the MFP causes the printer 107 to form an image of the designated document data and print it.

<Example of Job Log Information>

FIG. 14 shows a record of a document scan operation pertaining to the operation ID "128". This record will be called a scan job log or scan job log information. The job log includes the operation ID of an operation which generated a job, a job log record number uniquely assigned to each item of the job log, and a job type such as scan, print, or copy. The job log also includes a job ID unique to the job, the status of the job, the start date & time and end date & time of the job, and a department ID entered in login by an operator who designated generation and execution of the job. Further, the job log includes the document ID of document data generated by scanning, the number of scanned surfaces, paper size, a color mode representing color or monochrome, and a designated scan mode. In the embodiment, log information corresponding to one job ID will be called a job log record and discriminated from the entire log. When a plurality of jobs are generated for one operation, a plurality of job log records are recorded for one operation ID, but one job log record is recorded for one job ID.

FIG. 15 shows a record of a print operation pertaining to the operation ID "326". This record will be called a print job log or print job log information. The job log includes only a single job log record. When a plurality of jobs are executed, log records as shown in FIG. 15 are recorded by the number of jobs. In the foregoing case, an image scanned by the scanner 106 is printed. Print data may also be received from a network-connected computer and printed. Unlike the scan job log, the job log record in FIG. 15 includes the number of logical surfaces (e.g., four for one sheet with a 2in1 layout in two-sided printing) printed by the print job, and the paper size. In addition, the job log record includes the number of delivered sheets (e.g., one for one sheet with a 2in1 layout in two-sided printing), the number of print surfaces (e.g., two for one sheet with a 2in1 layout in two-sided printing), the page layout, and the print side (single side/two sides).

<Log Management by Log Management Application>

The operation of the log management application 1003 will be explained with reference to the flowchart of FIG. 16. The log management application 1003 is recorded in the HD 104, loaded into the RAM 103, and executed by the CPU 101. The process of this flowchart may be done at a predetermined time interval or every time the job log recording unit 1008 and operation log recording unit 1009 update log information. According to the sequence of FIG. 16, the operation log and job log are updated in accordance with the contents of the latest operation.

In step S1601, the log management application 1003 acquires the operation ID of the latest operation log record from the operation log recording unit 1009. In step S1602, the log management application 1003 determines whether the operation ID acquired in S1601 matches that of the latest one of read operation log records in the operation log recording unit 1009. If the two operation IDs match each other, the process advances to S1609; if they do not match each other, to S1603.

In step S1603, the log management application 1003 acquires the operation ID of the latest one of read operation log records saved in the operation log accumulation unit 1005. Then, the log management application 1003 acquires, from the operation log recording unit 1009, operation log records up to the latest operation ID from an operation ID next to that of the latest read operation log record. The acquired operation log records are accumulated in the HD or the like. If a plurality of operation log records have not been acquired yet, all of them are acquired. Note that operation IDs are assumed to be assigned as serial numbers.

In step S1604, the log management application 1003 updates the operation ID of the read operation log record to the latest operation ID acquired in S1603. The operation ID needs to be updated when the operation ID of a read operation log record is saved as independent data, but may not be particularly updated when the operation ID is acquired from accumulated operation log records.

In step S1605, the log management application 1003 determines whether all the operation log records acquired and accumulated in S1603 have been scanned. If all the operation log records have been scanned, the process advances to step S1609; if not all of them have been scanned, to step S1606.

In step S1606, the log management application 1003 extracts one of the operation log records acquired in step S1603. The extracted operation log record will be called an operation log record of interest. In step S1607, the log management application 1003 determines whether the process content recorded in the operation log record of interest is generation of a document. If the process content is generation of a document, the process advances to S1608; if it is not generation of a document, to S1605. Operations accompanying generation of a document are scanning of a document by the scanner 106, reception of document data via the communication unit 109, and copying of data saved in the ROM 102, RAM 103, HD 104, or the like. Hence, it can be determined that the process content is generation of a document for an operation log record in which "generate a document", "change a document name", or the like is recorded in the parameter field of the operation log record of interest.

In step S1608, the log management application 1003 extracts a document ID recorded in the parameter field of the operation log record of interest, and adds it to, for example, a document list stored in the HD 104 or the like. One record of the document list includes the document name, creation date & time, the document ID of a user who performed a relevant operation, and the page count, in addition to the document ID. These kinds of information are obtained from the operation log record. In this example, even when adding a document ID to the document list, at least one of these kinds of information other than the document ID is added.

In the copy operation log record shown in FIG. 12, a document ID is recorded in the parameter of a record in which a process "copy" is recorded. However, as for a scan operation and print operation, the process of a record in which a document ID is recorded is "start" in FIG. 11 or "select a document" in FIG. 13, so it is difficult to specify the process content from only this record. Hence, to simply the process, both the process content and document ID suffice to be recorded in the operation log record of an operation in which both the process content and document ID are finalized. Needless to say, the record shown in FIG. 11 or the like may also be recorded without any change. In this case, when an operation log record containing a document ID is fetched before an operation log record representing a process content in a series of operations, as shown in FIG. 13, the document ID is temporarily stored. After an operation log record capable of specifying a process content is fetched, it is determined that the stored document ID has been generated by this process. To the contrary, when an operation log record representing a process content is fetched before an operation log record containing a document ID in a series of operations, the process content is temporarily stored. After an operation log record capable of specifying a document ID is fetched, it is determined that the fetched document ID has been generated by the stored process. In step S1608, the log management application 1003 adds, to the document list, a document ID determined to have been generated in this way. In the embodiment, when the process content is an operation accompanying generation of a document, the document ID and document name are always recorded in the parameter field of the operation log record for descriptive convenience.

As a result, the log management application 1003 completes adding a document ID from a newly acquired operation log record to the document list.

In step S1609, the log management application 1003 acquires the job ID of the latest one of recorded job log records from the job log recording unit 1008.

In step S1610, the log management application 1003 determines whether the job ID acquired in S1609 matches that of the latest one of read job log records in the job log accumulation unit 1004. If the two job IDs match each other, the process ends; if they do not match each other, advances to S1611.

In step S1611, the log management application 1003 acquires the job ID of the latest one of the read job log records saved in the job log accumulation unit 1004. Then, the log management application 1003 acquires, from the job log recording unit 1008, job log records up to the latest job ID from a job ID next to that of the latest read job log record. The acquired job log records are accumulated in the HD or the like. If a plurality of job log records have not been acquired yet, all of them are acquired. Note that job IDs are assumed to be assigned as serial numbers.

In step S1612, the log management application 1003 updates the job ID of the read job log record to the latest job ID acquired in S1611. The job ID needs to be updated when the job ID of a read job log record is saved as independent data, but need not be particularly updated when the job ID is acquired from accumulated job log records.

In this fashion, the operation log and job log are updated.

<Log Reference Window>

Figure 17:
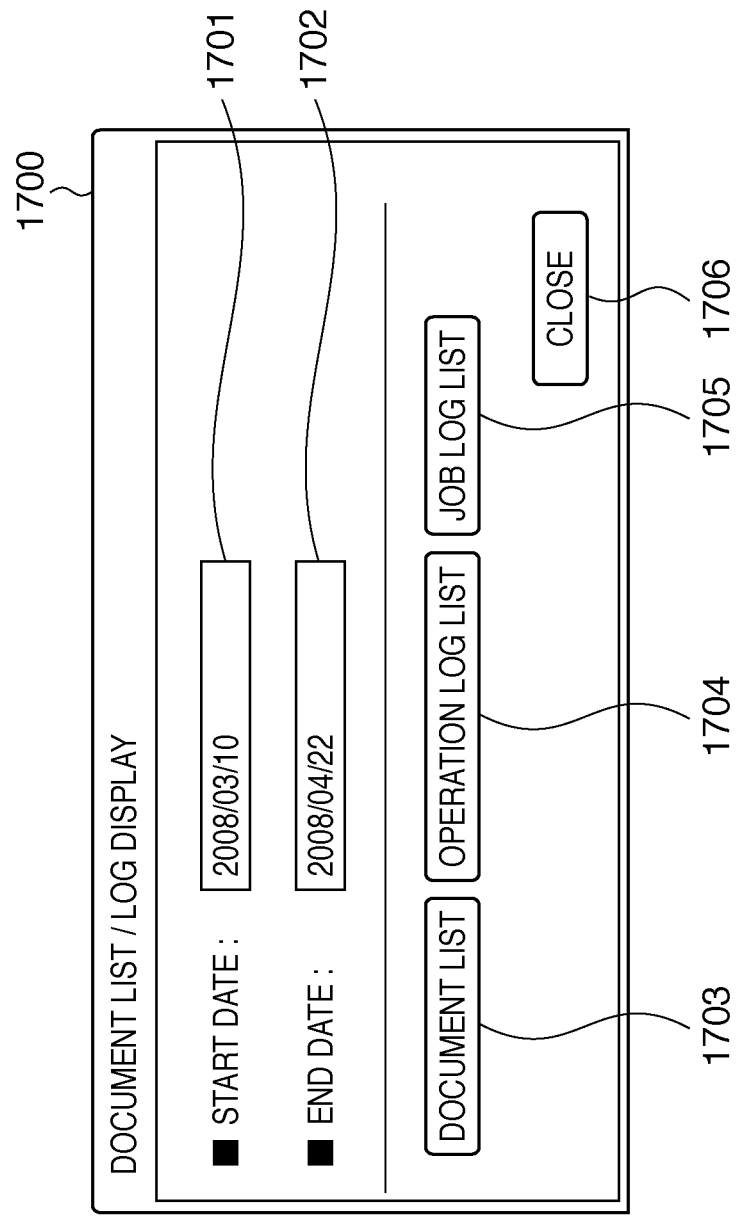
FIG. 17 is a view showing an example of a window for designating the date & time of log display.
Figure 18:
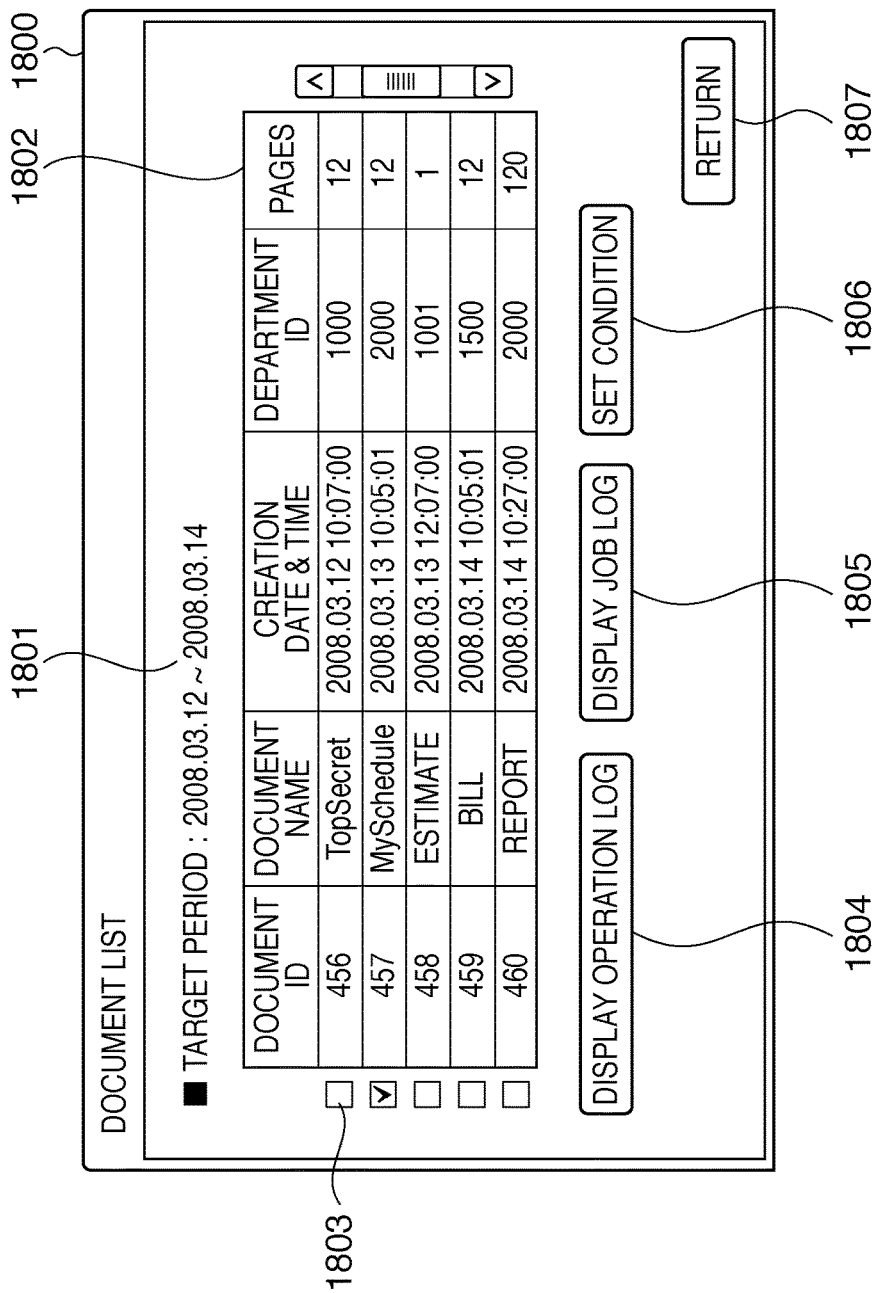
FIG. 18 is a view showing an example of a document log window.
Figure 19:
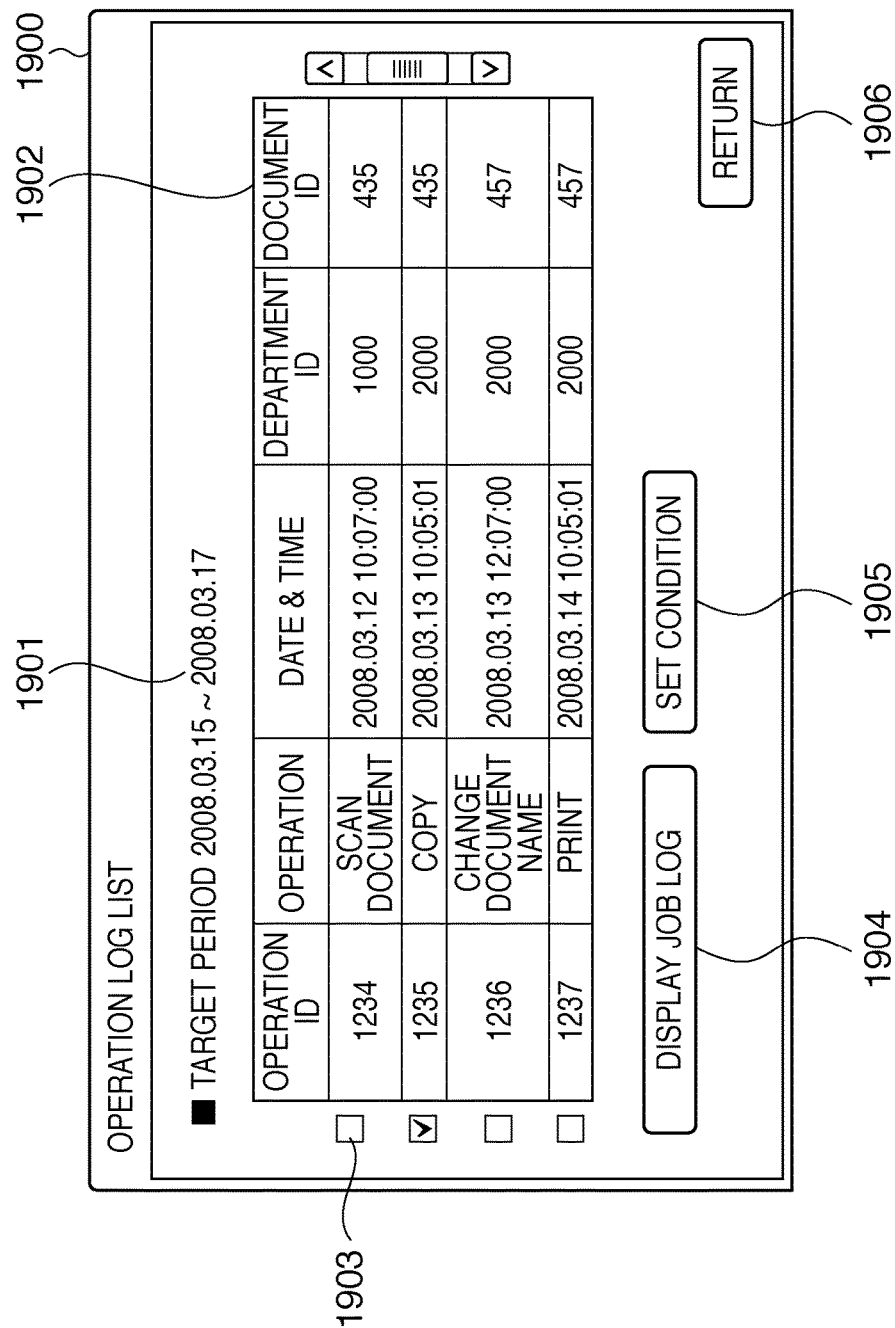
FIG. 19 is a view showing an example of an operation log window.
Figure 21:
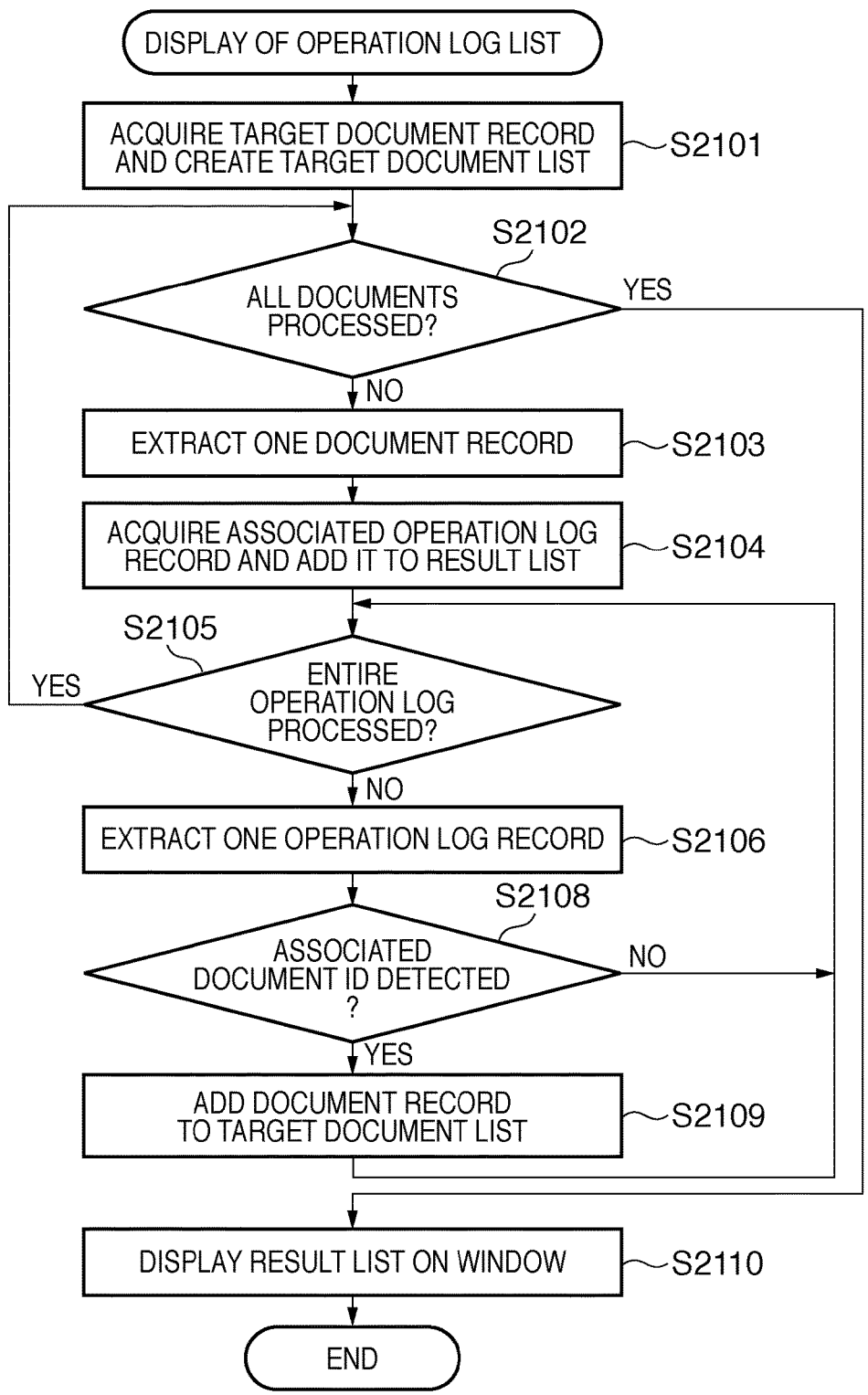
FIG. 21 is a flowchart showing a process to display an operation log.

FIG. 17 shows an example of an entry window provided by the UI unit 1006 to refer to a log. This window may also be displayed on the touch panel 400, or on a WEB browser by sending back HTML data in response to a request from a network-connected computer via the communication unit 1007. Referring to FIG. 17, a start date & time is designated in a text box 1701, and an end date & time is designated in a text box 1702. These boxes designate a target period for displaying a document list, operation log list, and job log list. A button 1703 is used to designate display of a document list. When the user presses the button 1703, a document list window appears as shown in FIG. 18. A button 1704 is used to designate display of an operation log list. When the user presses the button 1704, an operation log list window appears as shown in FIG. 19. A button 1705 is used to designate display of a job log list. When the user presses the button 1705, a job log list window appears as shown in FIG. 21. When the user presses a close button 1706, the window returns to a previous one.

FIG. 18 shows an example of a document list window 1800. A display field 1801 represents a target period designated in the window of FIG. 17. A document window list table 1802 includes columns for displaying a document ID, document name, creation date & time, department ID, and page count. A target document whose operation log or job log (to be described later) is to be displayed is designated in a check box 1803. An operation log display button 1804 is used to display an operation log associated with a document designated in the check box 1803. A job log display button 1805 is used to display a job log associated with a document designated in the check box 1803. A condition setting button 1806 is used to change a condition to display a document. Although an example of a concrete window will be omitted, the user can designate the following conditions: (1) limit document IDs such as document IDs before or after a specific number or a range of document IDs, (2) designate document names containing or not containing a specific character string, (3) limit a creation date & time, (4) limit a creation department, and (5) limit the number of pages. When the user presses a return button 1807, the window returns to the previous one.

FIG. 19 shows an example of an operation log list window 1900. This window may appear in response to pressing any one of the button 1704, the button 1804, and an operation log display button 2004 (to be described later). A display field 1901 represents a designated target period. An operation log list table 1902 includes columns for displaying an operation ID, operation, date & time, department ID, and document ID. A check box 1903 is used to designate a target operation whose job log (to be described later) is to be displayed. A job log display button 1904 is used to display a job log associated with an operation designated in the check box 1903. A condition setting button 1905 is used to designate a condition to limit operations to be displayed in the operation log list table 1902, similar to the condition setting button 1806. When the user presses a return button 1906, the window returns to the previous page.

When setting a condition upon pressing the condition setting button 1905, the user may designate a document name to contain an original document name (e.g., "TopSecret") as a specific character string. This facilitates a search for an operation log record upon changing a document name, as represented by an operation ID "229". Further, the user can easily track processes executed on an important document by displaying a job log associated with a detected record using the job log display button 1904. This configuration cannot be achieved by a system which manages only a job log, and can provide a UI considering higher usability.

Figure 20:
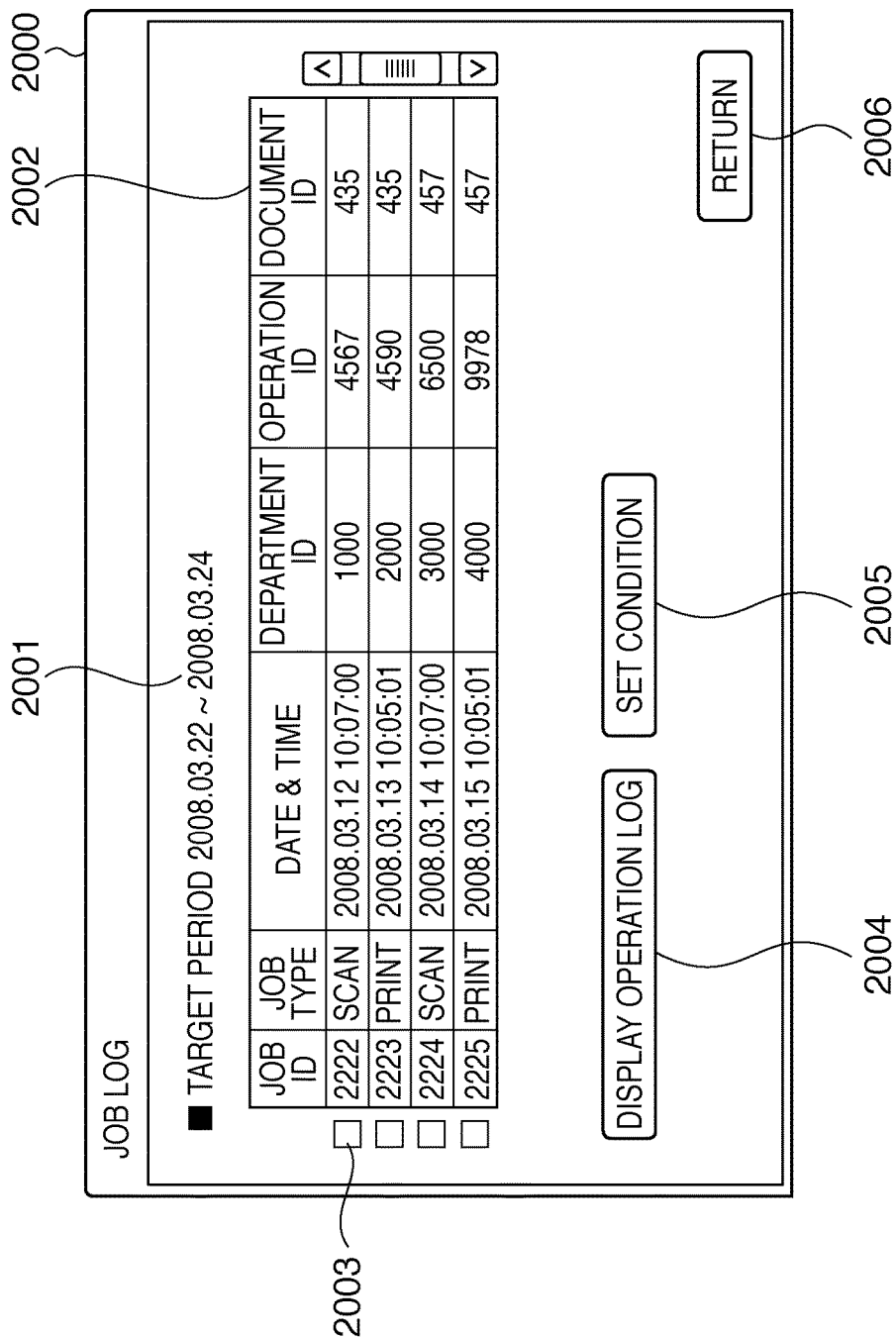
FIG. 20 is a view showing an example of a job log window.

FIG. 20 shows an example of a job log list window 2000. A display field 2001 represents a designated target period. A job log list table 2002 includes columns for displaying a job ID, job type, date & time, department ID, operation ID, and document ID. A check box 2003 is used to designate a target job log whose operation log is to be displayed. The operation log display button 2004 is used to display an operation log associated with the job log designated in the check box 2003. A condition setting button 2005 is used to designate a condition to limit job logs to be displayed in the job log list table 2002, similar to the condition setting button 1806. When the user presses a return button 2006, the window returns to the previous page.

<Operation Log List Display Process>

A flowchart in FIG. 21 shows a sequence to display the operation log list window shown in FIG. 19 for, for example, document data selected from the document log list table 1802 in FIG. 18. In S2101, the record of a document list (to be referred to as a document record) for which an operation log to be displayed is determined is acquired from a document list created in the process of FIG. 16. The document record acquired from the document list will be called a target document record. A set of target document records will be called a target document list. Document data corresponding to a target document record is sometimes called specified document data. When displaying documents using the operation log list button 1704 of an entry window 1700, all documents generated between a start date entered in the text box 1701 and an end date entered in the text box 1702 are displayed. For this purpose, the document list is sorted by the generation date & time, and all document records in a designated period are acquired as a target document list. "Acquire" means reading a document record from the HDD or the like and copying it in the RAM or the like. When displaying documents using the operation log display button 1804 of the document list window 1800, documents selected in the check boxes 1803 are displayed as a target document list. In this case, the document list is searched for a selected document ID, obtaining a target document list. When displaying the operation log list window 1900 from the job log list window 2000 shown in FIG. 20, document data selected upon pressing the operation log display button 1804 serves as specified document data to specify a target document record.

In step S2102, it is determined whether all the target document records acquired in S2101 have been scanned. If all the target document records have been scanned, the process advances to S2110; if not all of them have been scanned, to S2103. In step S2103, one document record is extracted from the target document list. The extracted document record will be called a document record of interest. In step S2104, all operation log records associated with the document record of interest extracted in step S2103 are extracted from the operation log accumulation unit 1005 and added to an associated operation log list. The operation log records associated with a document record of interest are operation log records containing, for example, the document name and document ID of the document record of interest.

The document-associated operation log list will also be called a result list as shown in FIG. 21. The associated operation log list is an operation log list displayed in the operation log list table 1902, and is a final list. If no associated operation log list exists, a new list is created in step S2104. The association can be determined by searching an operation log for the document ID of a document record of interest, and determining an operation log record containing the document ID as an associated operation log record. The associated operation log list is a list of operation log records determined to be associated with a document record of interest.

In step S2105, it is determined whether the entire associated operation log list has been scanned. If the entire associated operation log list has been scanned, the process advances to S2102; if the entire list has not been scanned, to S2106. In step S2106, one operation log record is extracted from the associated operation log list. The extracted operation log record will be called an operation log record of interest.

In step S2108, it is determined whether the operation log record of interest contains a document ID representing an associated document. If the operation log record of interest contains the document ID, the document record of interest is added as an associated document record to the document list, that is, additionally saved in step S2109. Note that a document record which has already been contained in the target document list need not be added. After that, the process advances to step S2105. If a document record is added to the document list, the process returns to step S2102 and is executed again from step S2103.

In step S2110, the operation log list table 1902 displays associated operation log records contained in the associated operation log list.

In this manner, a created document can be specified from the period during which it was created, the document itself, or a job which created it. The log of operations associated with the document can be displayed.

Note that the job log list can also be displayed by the sequence of FIG. 21. In this case, the "operation log" in the sequence and description of FIG. 21 is rewritten into the "job log".

This sequence will be summarized. First, an operation, job, and document are stored in association with each other. Then, when searching for an operation log based on a specified document, an operation log directly associated with the document, and documents associated with operations contained in the operation log are determined as the specified document. In other words, an operation log associated with the document is displayed as a target operation log. In this case, the output is display.

<Job Log List Display Process>

Figure 22:
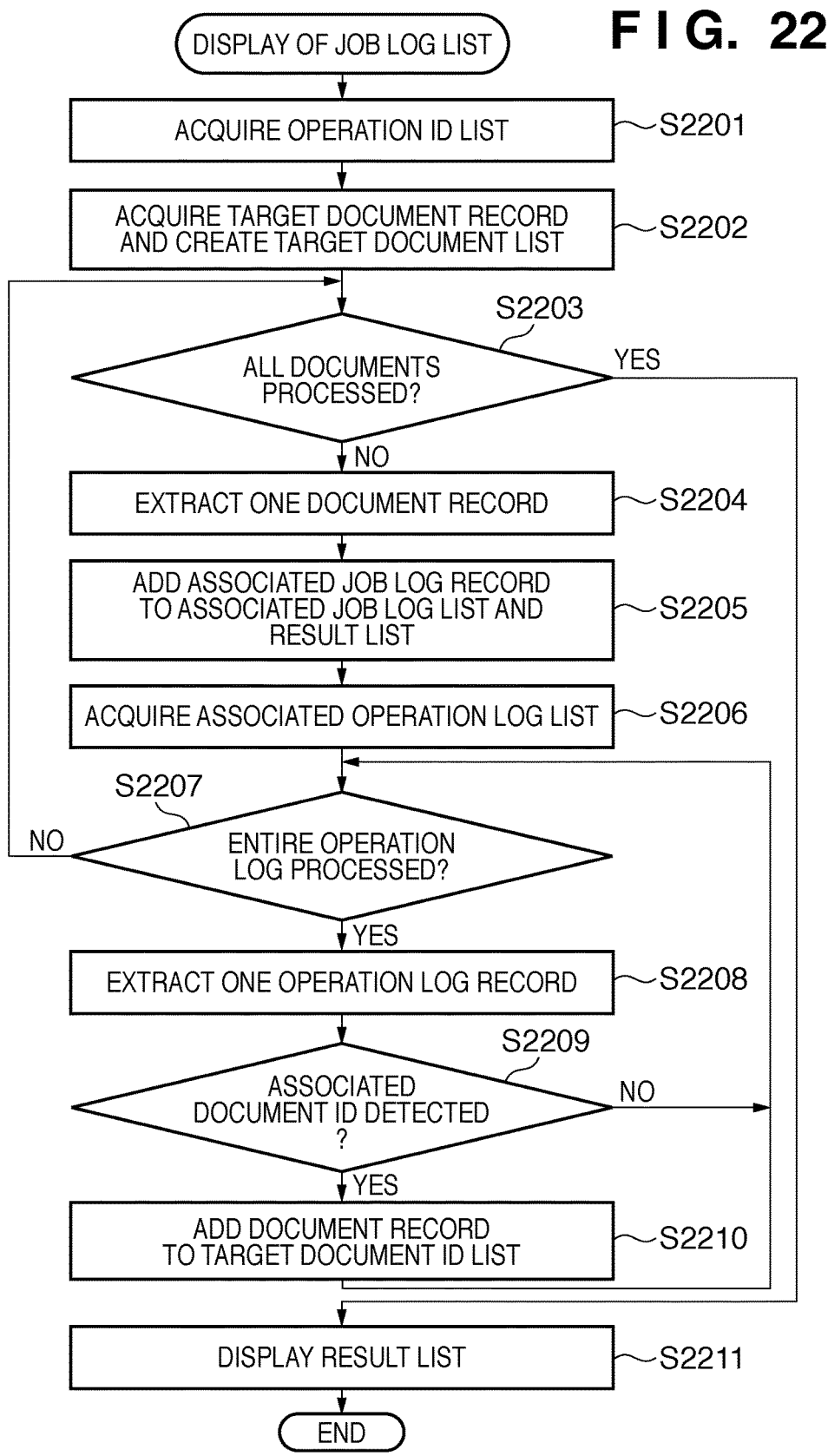
FIG. 22 is a flowchart showing a process to display a job log.

The operation of the log management application 1003 will be explained with reference to the flowchart of FIG. 22. FIG. 22 shows an example of a process to display the job log list window 2000 in FIG. 20 from the operation log list window 1900 in FIG. 19. The log management application 1003 is recorded in the HD 104, loaded into the RAM 103, and executed by the CPU 101. When the user selects an operation log record and presses the job log display button 1904 in FIG. 19, the log management application 1003 executes the sequence of FIG. 22. In this case, document data associated with an operation selected in the operation log list window 1900 serves as specified document data to create a display job log list.

In step S2201, the log management application 1003 acquires the operation log record of an operation selected in the check box 1903 as an operation ID list. In step S2202, the log management application 1003 acquires, as a document ID list, all documents corresponding to the operation ID list in S2201, and sets the acquired document ID list as an unprocessed document ID list. When displaying the job log list window 2000 from the document list window 1800, document data selected upon pressing the job log display button 1805 serves as document data (i.e., document ID list) specified as a processing target.

Figure 16:
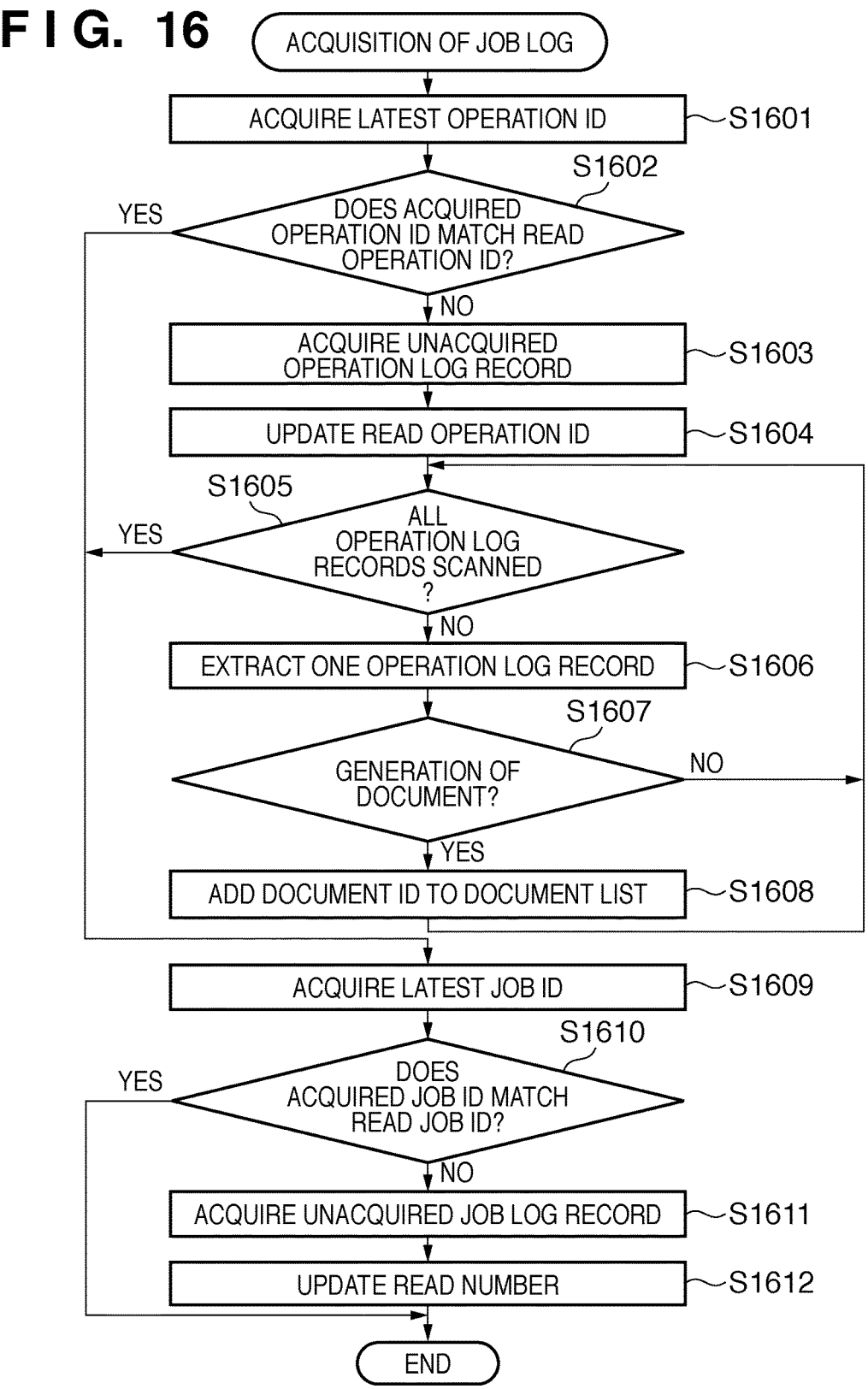
FIG. 16 is a flowchart showing a process to acquire a job log.

As described above, in S2202, the record of a document list (to be referred to as a document record) for which a job log to be displayed is determined is acquired from a document list created in the process of FIG. 16. The document record acquired from the document list will be called a target document record. A set of target document records will be called a target document list. When displaying documents using the job log list button 1705 of the entry window 1700, all documents generated between a start date entered in the text box 1701 and an end date entered in the text box 1702 are displayed. For this purpose, the document list is sorted by the generation date & time, and all document records in a designated period are acquired as a target document list. "Acquire" means reading a document record from the HDD or the like and copying it in the RAM or the like. When displaying documents using the job log display button 1805 of the document list window 1800, documents selected in the check boxes 1803 are displayed as a target document list. In this case, the document list is searched for a selected document ID, obtaining a target document list. When displaying documents using the operation log display button 2004 of the operation log list window 2000, documents selected in the check boxes 2003 are displayed as a target document list, like step S2201.

In step S2203, it is determined whether the entire target document list has been scanned. If the entire target document list has been scanned, the process ends; if it has not been scanned, advances to step S2204. In step S2204, one document record of interest is extracted from the target document list. In step S2205, all the job log records of jobs associated with the document of the document record of interest extracted in step S2204 are obtained and saved as an associated job log list. The job log record of an associated job is a job log record containing, for example, the document name or document ID of document data of interest. The obtained associated job log list is added to the result list. Even for one document, there are a plurality of job log records such as scanning, output, and sending of the document. Thus, all such job log records are obtained. The result list is a job log list to be finally displayed in the job log table 2002. To obtain the result list, the job log is searched for the document ID of the document record of interest to acquire all associated job log records.

In step S2206, the log management application 1003 acquires all operation log records corresponding to each job log record from the operation log for the associated job log list acquired in S2205, and stores them as an associated operation log list. For this purpose, the log management application 1003 acquires all operation log records having an operation ID contained in each job log record. An operation log record corresponding to a job log record is, for example, an operation log record having an operation ID contained in the job log record.

In step S2207, the log management application 1003 determines whether all the operation log records in the associated operation log list in S2206 have been scanned. If all the operation log records have been scanned, the process advances to S2203; if not all of them have been scanned, to step S2208. In step S2208, one operation log record is extracted from the associated operation log list. In step S2209, the log management application 1003 determines whether there is a document ID (associated document ID) corresponding to the operation log record acquired in S2208. If there is a corresponding document ID, the process advances to S2210; if there is no corresponding document ID, to S2207. The associated document ID is a document ID contained in the operation log record (or a document ID contained in one of a series of operation log records associated with the operation). In step S2210, the log management application 1003 adds the document record of the document ID obtained in S2209 to the target document list. The log management application 1003 determines in step S2203 that the added document record has not been processed, and processes it in step S2204 and subsequent steps. In step S2211, the log management application 1003 displays the result list.

In this way, a created document can be specified from the period during which it was created, the document itself, or an operation which created it. The log of jobs associated with the document can be displayed.

This sequence will be summarized. First, an operation, job, and document are stored in association with each other. Then, when searching for a job log based on a specified document, a job log directly associated with the document, and documents associated with operations associated with jobs contained in the job log are determined as the specified document. In other words, even a job log associated with the document is also output as a target job log.

According to this sequence, a job associated with a document is acquired as a target job log. An operation log associated with the job is searched. If the operation log is detected, a job log is further generated from a document associated with the operation log. Hence, even if the name of a document has changed between jobs which processed the document, all jobs can be listed as an associated job log.

This allows freely referring to a job log or operation log associated with a designated item from a document list, job log, or operation log. An operation and job associated with a document, a job associated with an operation, and an operation associated with a job can be specified. Access to or leakage of confidential information can be easily tracked.

Second Embodiment

In the first embodiment, the log management application runs on the image processing apparatus. In the second embodiment, a network-connected computer collects various logs of a plurality of image forming apparatuses. The user can analyze and browse the collected logs on the network computer, similar to the first embodiment.

Figure 23:
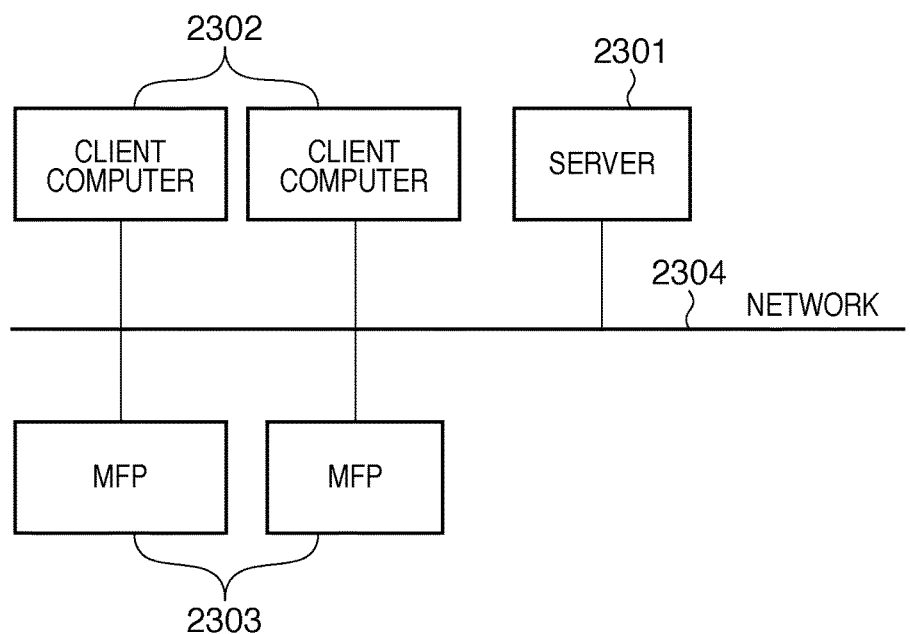
FIG. 23 is a block diagram showing an example of a network configuration.

FIG. 23 is a block diagram of MFPs 100 or 2303, a server computer 2301, and client computers 2302 which are arranged on a network 2304.

In each MFP 2303, various kinds of jobs can be input from a UI unit 108. A client computer can also input a print job using PDL (Page Description Language), or save a job in a box using a predetermined protocol. The MFP 2303 can also receive an image scanned by a scanner 106. Each job is recorded as a job log in a job log recoding unit 1008 in an HDD 104, as shown in FIGS. 14 and 15.

The server computer 2301 collects job logs and operation logs from a plurality of MFPs 2303, and permanently accumulates them.

Figure 24:
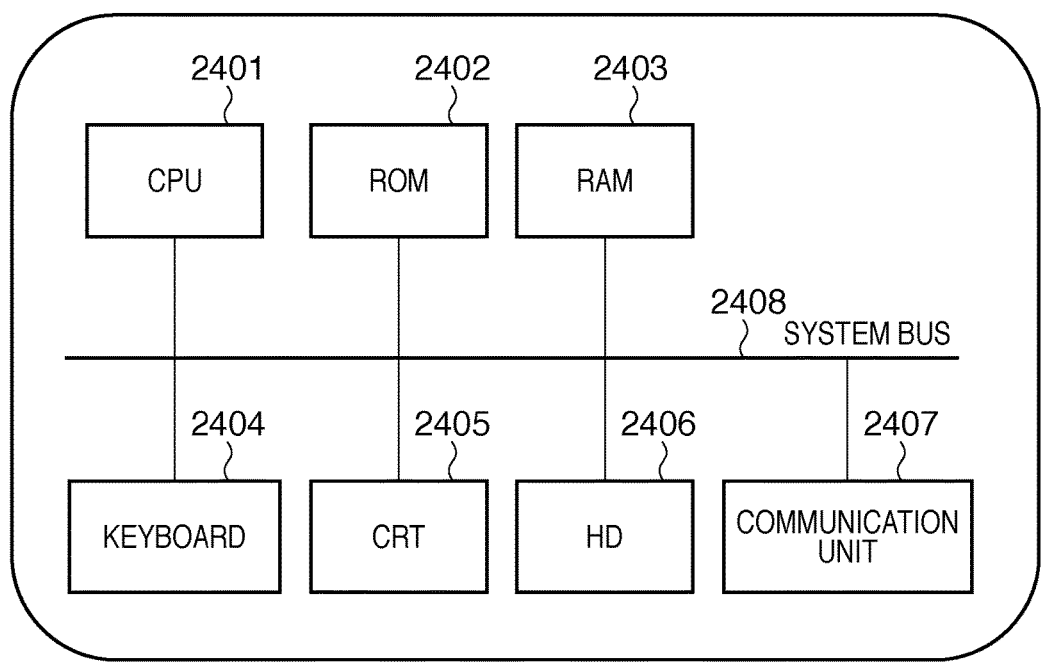
FIG. 24 is a block diagram of a computer.

FIG. 24 is a block diagram showing the server computer 2301 and client computer 2302. Referring to FIG. 24, a CPU (Central Processing Unit) 2401 controls the overall computer apparatus and performs an arithmetic process and the like. A ROM (Read Only Memory) 2402 is a storage area for information on a system boot program and the like. A RAM (Random Access Memory) 2403 is a data storage area free from any use restriction. The RAM 2403 is an area where programs such as an operating system, application, device driver, and communication control are loaded and executed. A KBC (KeyBoard Controller) 2404 receives data input from a keyboard and transfers it to the CPU. A CRT (display unit) & display controller 2405 controls display on a display device. An external storage 2406 is a nonvolatile storage such as an FD (Flexible Disk) or HD (Hard Disk), and stores programs and data. If necessary, the programs and data are referred to or loaded into the RAM in execution. A communication unit 2407 performs network communication control, and can communicate with another network-connected computer and peripheral device, as described with reference to FIG. 1. A system bus 2408 serves as a data path between these components.

Figure 25:
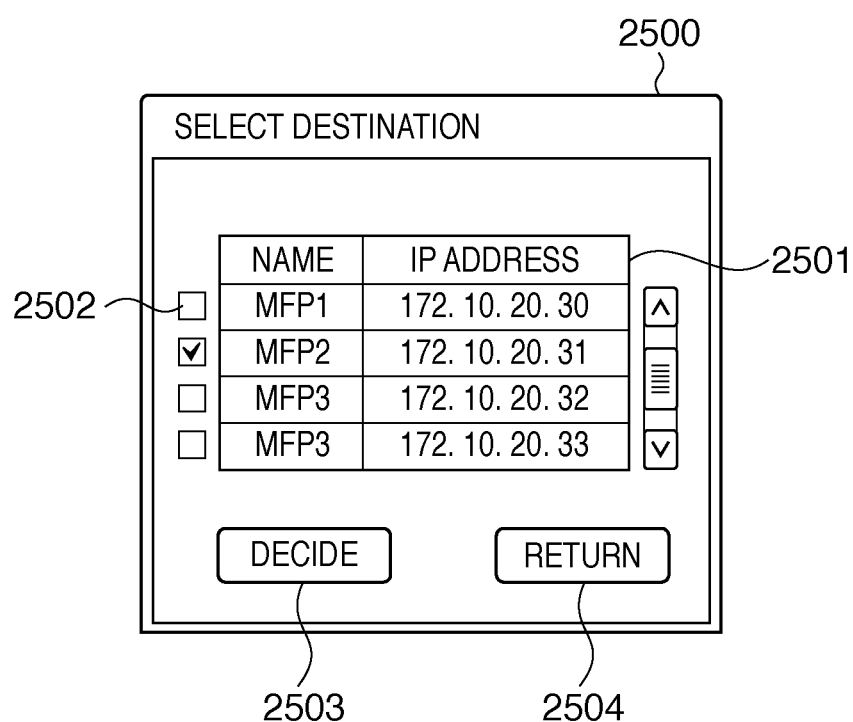
FIG. 25 is a view showing an example of a destination selection window.

When the user presses a send button 506 in FIG. 5, the UI unit 108 displays a destination selection window 2500 in FIG. 25. A destination list table 2501 displays a destination name and IP address. A check box 2502 is used to select a destination. A button 2503 is a decision button. When the user presses the button 2503, document data is sent to a destination selected in the check box 2502. The user presses a return button 2504 to return to a previous window.

FIG. 26 shows an operation log when a document was sent. An operation log record of an operation ID "625" represents that a document abc was selected from a boxed document list 501. An operation log record of an operation ID "626" represents that the send button 506 was pressed. An operation log record of an operation ID "627" represents that MFP1 (IP address: 172.10.20.30) was selected in the check box 2502. An operation log record of an operation ID "628" represents that the decision button 2503 was pressed.

FIG. 27 shows a job log representing a document send record. A destination ID is a destination device ID for uniquely specifying a device. FIG. 27 shows only one job log record.

FIG. 28 shows a job log representing a document reception record. A source ID is a source device ID.

The second embodiment adopts almost the same processes as those in FIGS. 16, 21, and 22 except that when recording a job log, reception of a document is also recorded as one job, the device ID of the document generating device is also recorded in the job log record, and a send operation is also recorded as an operation log record.

In step S2108 of FIG. 21 and step S2209 of FIG. 22 described above, when searching for an associated document, it is specified in association with the document ID and a device ID representing a device which has generated the document. For example, when the process content of an operation log record is "send", the job log is searched for a send job which has sent the document ID, acquiring a corresponding destination ID. When the destination is a remote device, an operation log record and job log record associated with the document ID are acquired from the device having the destination ID. The sequences to acquire an operation log record and job log record are the same as those in FIGS. 21 and 22 except that the result list is not displayed but sent back to the requesting side. In this way, even the log of the remote device can be referred to.

This process allows tracking exchange of a document between a plurality of MFPs. Even when a document has been moved between a plurality of MFPs, the operation log and job log can be referred to seamlessly, easily grasping leakage of information. That is, when the job type is "send", not only job log information of a sending apparatus but also operation log information can be easily analyzed from job log information in a receiving apparatus.

The present invention may also be applied to a system including a plurality of devices (e.g., a host computer, interface device, reader, and printer), or an apparatus (e.g., a copying machine or facsimile apparatus) formed by a single device. The object of the present invention is also achieved by supplying a storage medium which stores a program for implementing the functions of the above-described embodiments to a system or apparatus, and reading out and executing the program stored in the storage medium by the computer of the system or apparatus. In this case, the program read out from the storage medium implements the functions of the above-described embodiments, and the program and the storage medium which stores the program constitute the present invention.

The present invention also includes a case in which an OS (Operating System) or the like running on the computer performs some or all of actual processes based on the instructions of the program and thereby implements the functions of the above-described embodiments. Further, the present invention is also applied to a case in which the program read out from the storage medium is written in the memory of a function expansion card inserted into the computer or the memory of a function expansion unit connected to the computer. In this case, the CPU of the function expansion card or function expansion unit performs some or all of actual processes based on the instructions of the written program, and thereby implements the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-179470, filed Jul. 9, 2008, which is hereby incorporated by reference herein in its entirety.

The invention claimed is:

1. An information processing apparatus including a display unit and a storage, comprising:
a memory; and
a processor in communication with the memory, wherein the processor controls to execute:
a first storage, configured to store, for each operation in an image processing apparatus, operation log information which associates an operation ID of the operation, a document ID of document data to be subjected to the operation, and information on an operator in the storage, wherein the operation log information is history information indicative of each input by the operator via an operation unit of the image processing apparatus;
a second storage, configured to store, for each job executed in the image processing apparatus, job log information which associates a job ID of the job, a document ID associated with the job, and information on an operator in the storage, wherein the job log information is history information different from the operation log information and about each image forming process to document data by the image processing apparatus, and wherein the job log information does not include the operation log information;

a controller configured to control the display unit to display a first list window of the operation log information stored in the first storage and a second list window of the job log information stored in the second storage;

a first selection unit, configured to allow a user to select operation log information via the first list window;

a second selection unit, configured to allow the user to select job log information via the second list window; and a search unit, configured to search, when job log information is selected by the second selection unit, the first storage for operation log information which matches at least either of the document ID and the information on the operator that are contained in the selected job log information, wherein the controller controls, when the job log information is selected by the second selection unit, the display unit to display the operation log information found by the search unit, wherein the search unit further searches, when operation log information is selected by the first selection unit, the second storage for job log information which matches at least either of the document ID and the information on the operator that are contained in the selected operation log information, and wherein the controller further controls, when the operation log information is selected by the first selection unit, the display unit to display the job log information found by the search unit.

2. The apparatus according to claim 1, wherein the second list window of the job log information presents a display for receiving a condition to narrow down and display the job log information to be designated by a user.

3. The apparatus according to claim 1, wherein:
the controller controls the display unit to display a document list generated in the image processing apparatus, and
the search unit further searches the second storage for job log information which matches a document ID of a document selected from the document list by the user, and
the controller further controls the display unit to display the found job log information found by the search unit.

4. The apparatus according to claim 1, wherein:
the job log information is further associated with an operation ID, and
the search unit searches the first storage for operation log information which matches at least one of the document ID, the information on the operator, and the operation ID that are contained in the job log information selected by the second selection unit.

5. The apparatus according to claim 1, wherein the search unit searches the first storage for operation log information of an image processing apparatus different from an image processing apparatus that has generated the selected job log information, which operation log information matches at least either of the document ID and the information on the operator that are contained in the job log information selected by the second selection unit.

6. The apparatus according to claim 1, wherein the information processing apparatus includes the image processing apparatus.

7. The apparatus according to claim 1, wherein the operation log information contains at least one record relating to the job log information and at least one record not relating to the job log information, and wherein a record of the operation log information found by the search unit is a record relating to the job log information.

8. An information processing method using an information processing apparatus including a display unit and a storage, comprising:

storing in a first storage of the information processing apparatus, for each operation in an image processing apparatus, operation log information which associates an operation ID of the operation, a document ID of document data to be subjected to the operation, and information on an operator, wherein the operation log information is history information indicative of each input by the operator via an operation unit of the image processing apparatus;

storing in a second storage of the information processing apparatus, for each job executed in the image processing apparatus, job log information which associates a job ID of the job, a document ID associated with the job, and information on an operator, wherein the job log information is history information different from the operation log information and about each image forming process to document data by the image processing apparatus, and wherein the job log information does not include the operation log information;

a control step of controlling the display unit to display a first list window of the operation log information stored in the first storage and a second list window of the job log information stored in the second storage;

a first selection step of allowing a user to select operation log information via the first list window;

a second selection step of allowing the user to select job log information via the second list window; and a search step of searching, when job log information is selected in the second selection step, the first storage for operation log information which matches at least either of the document ID and the information on the operator that are contained in the selected job log information, wherein in the control step, when the job log information is selected by the second selection step, the display unit is controlled to display the operation log information found in the search step, wherein, when operation log information is selected by the first selection step, the search step further searches the second storage for job log information which matches at least either of the document ID and the information on the operator that are contained in the selected operation log information, and wherein, in the control step, when the operation log information is selected by the first selection step, the display unit is further controlled to display the job log information found in the search step.

9. The method according to claim 8, wherein the second list window of the job log information presents a display for receiving a condition to narrow down and display the job log information to be designated by a user.

10. The method according to claim 8, wherein:
in the control step, the display unit is controlled to display a document list generated in the image processing apparatus, and
further in the search step, the second storage is searched for job log information which matches a document ID of a document selected from the document list by the user, and
the display unit is controlled in the control step to display the found job log information found in the search step.

11. The method according to claim 8, wherein:
the job log information is further associated with an operation ID, and
in the search step, the first storage is searched for operation log information which matches at least one of the document ID, the information on the operator, and the operation ID that are contained in the job log information selected in the second selection step.

12. The method according to claim 8, wherein in the search step, the first storage is searched for operation log information of an image processing apparatus different from an image processing apparatus that has generated the selected job log information, which operation log information matches at least either of the document ID and the information on the operator that are contained in the job log information selected in the second selection step.

13. The method according to claim 8 wherein the information processing apparatus includes the image processing apparatus.

14. The method according to claim 8, wherein the operation log information contains at least one record relating to the job log information and at least one record not relating to the job log information, and
wherein a record of the operation log information found in the searching is a record relating to the job log information.

15. A non-transitory computer-readable recording medium storing computer-executable code of a program which causes an information processing apparatus including a display unit and a storage to execute:
storing in a first storage of the information processing apparatus, for each operation in an image processing apparatus, operation log information which associates an operation ID of the operation, a document ID of document data to be subjected to the operation, and information on an operator, wherein the operation log information is history information indicative of each input by the operator via an operation unit of the image processing apparatus;
storing in a second storage of the information processing apparatus, for each job executed in the image processing apparatus, job log information which associates a job ID of the job, a document ID associated with the job, and information on an operator, wherein the job log information is history information different from the operation log information and about each image forming process to document data by the image processing apparatus, and wherein the job log information does not include the operation log information;
controlling the display unit to display a first list window of the operation log information stored in the first storage and a second list window of the job log information stored in the second storage;
a first selection step of allowing a user to select operation log information via the first list window;
a second selecting step of allowing the user to select job log information via the second list window; and
searching, when job log information is selected in the second selection step, the first storage for operation log information which matches at least either of the document ID and the information on the operator that are contained in the selected job log information,
wherein the controlling step controls, when the job log information is selected by the second selection step, the display unit to display the operation log information found by the search step,
wherein, when operation log information is selected by the first selection step, the search step further searches the second storage for job log information which matches at least either of the document ID and the information on the operator that are contained in the selected operation log information, and
wherein the display unit is further controlled in the control step to, when the operation log information is selected by the first selection step, display the job log information found in the search step.

16. The medium according to claim 15, wherein the second list window of the job log information presents a display for prompting the user to designate a condition to narrow down and display the job log information.

17. The medium according to claim 15, wherein:
the controlling step controls the display unit to display a document list generated in the image processing apparatus, and
the search step further searches the second storage for job log information which matches a document ID of a document selected from the document list by the user, and
the controlling step further controls the display unit to display a list window of the found job log information found by the search step.

18. The medium according to claim 15, wherein:
the job log information is further associated with an operation ID, and
the search step searches the first storage for operation log information which matches at least one of the document ID, the information on the operator, and the operation ID that are contained in the job log information selected in the second selection step.

19. The medium according to claim 15, wherein the search step searches the first storage for operation log information of an image processing apparatus different from an image processing apparatus that has generated the selected job log information, which operation log information matches at least either of the document ID and the information on the operator that are contained in the job log information selected in the second selection step.

20. The medium according to claim 15, wherein the information processing apparatus includes the image processing apparatus.

21. The medium according to claim 15, wherein the operation log information contains at least one record relating to the job log information and at least one record not relating to the job log information, and
wherein a record of the operation log information found in the searching is a record relating to the job log information.

* * * * *